US008001377B2

(12) United States Patent
Suzuoki et al.

(10) Patent No.: US 8,001,377 B2
(45) Date of Patent: Aug. 16, 2011

(54) METHODS AND APPARATUS FOR SECURE DATA PROCESSING AND TRANSMISSION

(75) Inventors: Masakazu Suzuoki, Austin, TX (US); Akiyuki Hatakeyama, Austin, TX (US)

(73) Assignee: Sony Computer Entertainment Inc., Tokyo (JP)

( * ) Notice: Subject to any disclaimer, the term of this patent is extended or adjusted under 35 U.S.C. 154(b) by 192 days.

(21) Appl. No.: 12/352,817

(22) Filed: Jan. 13, 2009

(65) Prior Publication Data
US 2009/0125717 A1 May 14, 2009

Related U.S. Application Data

(63) Continuation of application No. 10/985,354, filed on Nov. 12, 2004, now Pat. No. 7,502,928.

(51) Int. Cl.
*H04L 9/00* (2006.01)
(52) U.S. Cl. ........................................................ 713/166
(58) Field of Classification Search .................. 713/164, 713/166, 189; 726/3
See application file for complete search history.

(56) References Cited

U.S. PATENT DOCUMENTS

| 4,633,388 | A | 12/1986 | Chiu |
| 6,526,491 | B2 | 2/2003 | Suzuoki et al. |
| 6,708,273 | B1 | 3/2004 | Ober et al. |
| 6,820,187 | B2 | 11/2004 | Asano |
| 6,826,662 | B2 | 11/2004 | Suzuoki et al. |
| 6,938,164 | B1 | 8/2005 | England et al. |
| 7,124,170 | B1 | 10/2006 | Sibert |
| 7,133,845 | B1 | 11/2006 | Ginter |
| 7,177,996 | B2 | 2/2007 | Ehama |
| 7,219,238 | B2 | 5/2007 | Saito |
| 7,219,369 | B2 | 5/2007 | Hashimoto |
| 7,225,333 | B2 | 5/2007 | Peinado |
| 7,322,042 | B2 | 1/2008 | Srinivasan |

(Continued)

FOREIGN PATENT DOCUMENTS

EP 0308219 A2 3/1989

(Continued)

OTHER PUBLICATIONS

International Search Report and Written Opinion for International PCT application PCT/JP2005/021177.

(Continued)

*Primary Examiner* — Ellen Tran
(74) *Attorney, Agent, or Firm* — Matthew B. Dernier, Esq.; Gibson & Dernier LLP

(57) ABSTRACT

Methods and apparatus provide for placing an apparatus into at least one of a plurality of operational modes, wherein: the apparatus includes a local memory, a bus operable to carry information to and from the local memory, one or more arithmetic processing units operable to process data and operatively coupled to the local memory, and a security circuit operable to place the apparatus into the operational modes; and the plurality of operational modes includes: (i) a first mode whereby the apparatus and an external device are operable to initiate a transfer of information into or out of the memory over the bus, (ii) a second mode whereby neither the apparatus nor the external device are operable to initiate a transfer of information into or out of the memory over the bus, and (iii) a third mode whereby the apparatus is operable to initiate a transfer of information into or out of the local memory over the bus, but the external device is not operable to initiate a transfer of information into or out of the local memory over the bus.

16 Claims, 18 Drawing Sheets

U.S. PATENT DOCUMENTS

| | | |
|---|---|---|
| 7,401,358 B1 | 7/2008 | Christie |
| 7,496,966 B1 | 2/2009 | McGrath |
| 2002/0062352 A1 | 5/2002 | Asano |
| 2002/0138707 A1 | 9/2002 | Suzuoki et al. |
| 2003/0182571 A1 | 9/2003 | Hashimoto |
| 2003/0235310 A1 | 12/2003 | Saito |
| 2004/0003321 A1 | 1/2004 | Glew et al. |
| 2004/0039924 A1* | 2/2004 | Baldwin et al. ............... 713/189 |
| 2005/0005081 A1 | 1/2005 | Ehama |
| 2005/0071651 A1* | 3/2005 | Aguilar et al. ............... 713/189 |
| 2005/0235166 A1 | 10/2005 | England et al. |

FOREIGN PATENT DOCUMENTS

| | | |
|---|---|---|
| EP | 1329787 A2 | 7/2003 |
| JP | 2002163239 A | 6/2002 |
| JP | 2002287978 A | 10/2002 |
| JP | 2002351850 A | 12/2002 |
| JP | 2003280989 A | 10/2003 |
| JP | 2003281071 A | 10/2003 |
| JP | 2004280623 A | 10/2004 |
| WO | 0105086 A2 | 1/2001 |
| WO | 03090052 A2 | 10/2003 |

OTHER PUBLICATIONS

Office Action for corresponding Japanese application No. 2005-327282 dated Apr. 21, 2009.

Office Action for corresponding Japanese application No. 2009-147826 dated Feb. 15, 2011.

* cited by examiner

METHODS AND APPARATUS FOR SECURE DATA PROCESSING AND TRANSMISSION

CROSS REFERENCE TO RELATED APPLICATIONS

This application is a continuation of U.S. patent application Ser. No. 10/985,354, filed Nov. 11, 2004, the entire disclosure of which is hereby incorporated by reference.

BACKGROUND OF THE INVENTION

The present invention relates to methods and apparatus for secure data processing using a multi-processor architecture for secure data processing in, for example, a broadband environment.

Real-time, multimedia, network applications are becoming increasingly important. These network applications require extremely fast processing speeds, such as many thousands of megabits of data per second. Conventional network architectures, such as the Internet, and the programming models presently embodied in, e.g., the Java model, have made reaching such processing speeds extremely difficult.

The computers and computing devices of conventional computer networks, e.g., local area networks (LANs) used in office networks and global networks such as the Internet, were designed principally for stand-alone computing. The sharing of data and application programs ("applications") over a computer network was not a principal design goal of these computers and computing devices. These computers and computing devices also typically were designed using a wide assortment of different processors made by a variety of different manufacturers, e.g., Motorola, Intel, Texas Instruments, Sony and others. Each of these processors has its own particular instruction set and instruction set architecture (ISA), i.e., its own particular set of assembly language instructions and structure for the principal computational units and memory units for performing these instructions. A programmer is required to understand, therefore, each processor's instruction set and ISA to write applications for these processors. This heterogeneous combination of computers and computing devices on today's computer networks complicates the processing and sharing of data and applications. Multiple versions of the same application often are required, moreover, to accommodate this heterogeneous environment.

The types of computers and computing devices connected to global networks, particularly the Internet, are extensive. In addition to personal computers (PCs) and servers, these computing devices include cellular telephones, mobile computers, personal digital assistants (PDAs), set top boxes, digital televisions and many others. The sharing of data and applications among this assortment of computers and computing devices presents substantial problems.

A number of techniques have been employed in an attempt to overcome these problems. These techniques include, among others, sophisticated interfaces and complicated programming techniques. These solutions often require substantial increases in processing power to implement. They also often result in a substantial increase in the time required to process applications and to transmit data over networks.

Data typically are transmitted over the Internet separately from the corresponding applications. This approach avoids the necessity of sending the application with each set of transmitted data corresponding to the application. While this approach minimizes the amount of bandwidth needed, it also often causes frustration among users. The correct application, or the most current application, for the transmitted data may not be available on the client's computer. This approach also requires the writing of a multiplicity of versions of each application for the multiplicity of different ISAs and instruction sets employed by the processors on the network.

The Java model attempts to solve this problem. This model employs a small application ("applet") complying with a strict security protocol. Applets are sent from a server computer over the network to be run by a client computer ("client"). To avoid having to send different versions of the same applet to clients employing different ISAs, all Java applets are run on a client's Java virtual machine. The Java virtual machine is software emulating a computer having a Java ISA and Java instruction set. This software, however, runs on the client's ISA and the client's instruction set. A version of the Java virtual machine is provided for each different ISA and instruction set of the clients. A multiplicity of different versions of each applet, therefore, is not required. Each client downloads only the correct Java virtual machine for its particular ISA and instruction set to run all Java applets.

Although providing a solution to the problem of having to write different versions of an application for each different ISA and instruction set, the Java processing model requires an additional layer of software on the client's computer. This additional layer of software significantly degrades a processor's processing speed. This decrease in speed is particularly significant for real-time, multimedia applications. A downloaded Java applet also may contain viruses, processing malfunctions, etc. These viruses and malfunctions can corrupt a client's database and cause other damage. Although a security protocol employed in the Java model attempts to overcome this problem by implementing a software "sandbox," i.e., a space in the client's memory beyond which the Java applet cannot write data, this software-driven security model is often insecure in its implementation and requires even more processing.

Therefore, there is a need in the art for new methods and apparatus for the secure processing of data in a cell architecture.

SUMMARY OF THE INVENTION

A new computer (and network) architecture has also been developed in order to overcome at least some of the problems discussed above. In accordance with this new computer architecture, all members of a computer network, i.e., all computers and computing devices of the network, are constructed from a common computing module (or cell). This common computing module has a consistent structure and preferably employs the same ISA. The members of the network can be, e.g., clients, servers, PCs, mobile computers, game machines, PDAs, set top boxes, appliances, digital televisions and other devices using computer processors. The consistent modular structure enables efficient, high speed processing of applications and data by the network's members and the rapid transmission of applications and data over the network. This structure also simplifies the building of members of the network of various sizes and processing power and the preparation of applications for processing by these members.

The new computer architecture also employs a new programming model that provides for transmitting data and applications over a network and for processing data and applications among the network's members. This programming model employs a software cell transmitted over the network for processing by any of the network's members. Each software cell has the same structure and can contain both applications and data. As a result of the high speed processing and transmission speed provided by the modular computer architecture, these cells can be rapidly processed. The code for the applications preferably is based upon the same common instruction set and ISA. Each software cell preferably contains a global identification (global ID) and information describing the amount of computing resources required for the cell's processing. Since all computing resources have the same basic structure and employ the same ISA, the particular resource performing this processing can be located anywhere on the network and dynamically assigned.

The basic processing module is a processor element (PE). A PE preferably comprises a processing unit (PU), a direct memory access controller (DMAC) and a plurality of attached processing units (APUs), such as four APUs, coupled over a common internal address and data bus. The PU and the APUs interact with a shared dynamic random access memory (DRAM), which may have a cross-bar architecture. The PU schedules and orchestrates the processing of data and applications by the APUs. The APUs perform this processing in a parallel and independent manner. The DMAC controls accesses by the PU and the APUs to the data and applications stored in the shared DRAM.

In accordance with this modular structure, the number of PEs employed by a member of the network is based upon the processing power required by that member. For example, a server may employ four PEs, a workstation may employ two PEs and a PDA may employ one PE. The number of APUs of a PE assigned to processing a particular software cell depends upon the complexity and magnitude of the programs and data within the cell.

The plurality of PEs may be associated with a shared DRAM, and the DRAM may be segregated into a plurality of sections, each of these sections being segregated into a plurality of memory banks. Each section of the DRAM may be controlled by a bank controller, and each DMAC of a PE may access each bank controller. The DMAC of each PE may, in this configuration, access any portion of the shared DRAM.

The DRAM may include sandboxes to provide a level of security against the corruption of data for a program being processed by one APU from data for a program being processed by another APU. Each sandbox defines an area of the shared DRAM beyond which a particular APU, or set of APUs, cannot read or write data.

While the use of sandboxes provides some security measure against data corruption, it does not address the issue of intentional software piracy. Since the plurality of APUs within a given PE are coupled over a common internal bus, the software running on one APU may be monitored by another APU. In a broadband network context, it would be desirable for two or more of the APUs within a given PE to run different application programs. In order to ensure high system flexibility, it is desirable to permit these software programs to be obtained from different entities, such as different software development companies. In some instances, a software development company may want assurances that its software application is secure and free from being copied or otherwise monitored.

In accordance with one or more aspects of the present invention, an apparatus includes: a local memory; a bus operable to carry information to and from the local memory; one or more arithmetic processing units operable to process data and operatively coupled to the local memory; and a security circuit operable to place the apparatus into at least one of a plurality of operational modes, including a first mode whereby the apparatus and an external device may initiate a transfer of information into or out of the memory over the bus, a second mode whereby neither the apparatus nor the external device may initiate a transfer of information into or out of the memory over the bus, and a third mode whereby the apparatus may initiate a transfer of information into or out of the memory over the bus, but the external device may not initiate a transfer of information into or out of the memory over the bus.

In accordance with one or more further aspects of the present invention, the security circuit is operable to place the apparatus into at least one of two operational modes, wherein the two operational modes include one of: (i) a first mode whereby the apparatus and an external device may initiate a transfer of information into or out of the local memory over the bus, and a third mode whereby the apparatus may initiate a transfer of information into or out of the local memory over the bus, but the external device may not initiate a transfer of information into or out of the local memory over the bus; and (ii) a second mode whereby neither the apparatus nor the external device may initiate a transfer of information into or out of the memory over the bus, and the third mode.

The security circuit preferably includes a secret data area that is not accessible by devices outside the security circuit, and the secret data area contains a first key and a second key. The security circuit also preferably includes an accessible data area that is accessible by devices outside the security circuit. Further, the security circuit includes logic circuitry operable to place a copy of the first key in the accessible data area when the apparatus is in the second mode. Preferably, the first key and the second key are stored in the secret data area in a controlled process whereby security is maintained prior to use of the apparatus.

The security circuit preferably places the apparatus into the second mode when the apparatus runs an authentication routine, which includes executing a decryption program and executing an authentication program, the authentication program including a copy of the second key, and the authentication program having been encrypted in accordance with the first key. The apparatus executes the decryption program such that the copy of the first key contained in the accessible data area is used to decrypt the authentication program.

The logic circuitry of the security circuit preferably places a copy of the second key into the accessible data area in response to the execution of the authentication program; and the logic circuitry makes a determination as to whether the copy of the second key contained within the authentication program matches the copy of the second key contained in the accessible data area.

The security circuit is operable to place the apparatus into the third mode when the copy of the second key contained within the authentication program matches the copy of the second key contained in the accessible data area.

In accordance with one or more further aspects of the present invention a plurality of the above-described apparatus are disposed in a single device.

In accordance with one or more further aspects of the present invention, a method includes placing an apparatus into at least one of a plurality of operational modes, wherein: the apparatus includes a local memory, a bus operable to carry information to and from the local memory, one or more arithmetic processing units operable to process data and operatively coupled to the local memory, and a security circuit operable to place the apparatus into the operational modes; and the plurality of operational modes includes a first mode whereby the apparatus and an external device may initiate a transfer of information into or out of the memory over the bus, a second mode whereby neither the apparatus nor the external device may initiate a transfer of information into or out of the memory over the bus, and a third mode whereby the apparatus may initiate a transfer of information into or out of the memory over the bus, but the external device may not initiate a transfer of information into or out of the memory over the bus.

In accordance with one or more further aspects of the present invention, an apparatus includes: a main processing unit; a plurality of attached processing units, each including a local memory and a decryption unit, and each being operable to enter a normal mode of operation or a secure mode of operation; and a shared memory, wherein: the main processing unit is capable of initiating data transfers between the shared memory and a given one of the attached processing units that bypass the decryption unit when the given attached processing unit is in the normal mode, and the main processing unit is not capable of: (i) initiating data transfers from the given attached processing unit to the shared memory; or (ii) initiating data transfers from the shared memory to the given attached processing unit that bypass the decryption unit, when the given attached processing unit is in the secure mode.

The attached processing units are preferably capable of initiating data transfers with the shared memory irrespective of whether they are in the normal mode of operation or the secure mode of operation. The attached processing units may be operable to enter the secure mode of operation upon at least one of a hardware reset condition and a power-up condition.

Each attached processing unit preferably includes a secure store containing a substantially unique key that is accessible only by at least one of the decryption unit of the given attached processing unit, and authorized entities. The decryption unit of each attached processing unit preferably uses the key to decrypt data transfers from the shared memory to the local memory that are initiated by the main processing unit when the given attached processing unit is in the secure mode of operation. Each attached processing unit is associated with a substantially unique ID that may be known to entities external to at least one of the given attached processing unit, and the apparatus.

The encrypted data is preferably encrypted by a secure entity external to the apparatus, the secure entity being authorized to use the key of the given attached processing unit. The secure entity may include a database containing the IDs and keys of participating attached processing units, each ID and key for a given attached processing unit being associated with one another. The secure entity encrypts data received from an un-secure entity, not authorized to use the key of a given attached processing unit, with the key of the given attached processing unit after the un-secure entity provides an ID associated with that key to the secure entity.

Preferably, the secure entity is operable to provide the encrypted data to the un-secure entity; the un-secure entity is operable to provide the encrypted data to the apparatus for storage in the shared memory; the main processing unit is operable to initiate a transfer of the encrypted data from the shared memory to the given attached processing unit such that the encrypted data is input into the decryption unit; and the decryption unit of the given attached processing unit is operable to decrypt the encrypted data using the key of the given attached processing unit such that the data is stored in the local memory of the given attached processing unit.

Alternatively, an un-secure entity, not authorized to use the key of a given attached processing unit, preferably encrypts the data using a first symmetric key, provides the encrypted data to the secure entity, and provides an ID associated with a given attached processing unit to the secure entity. The secure entity preferably decrypts the encrypted data provided by the un-secure entity using a second symmetric key, and encrypts the data using the key of the given attached processing unit that is associated with the ID received from the un-secure entity.

The un-secure entity preferably encrypts the data and the ID of the given attached processor unit using the first symmetric key and provides the encrypted data/ID to the secure entity. Finally, the secure entity is operable to encrypt the encrypted data using the second symmetric key and provide the encrypted-encrypted data to the un-secure entity; the un-secure entity is operable to decrypt the encrypted-encrypted data using the first symmetric key to obtain the encrypted data produced using the key of the given attached processing unit, and to provide the encrypted data to the apparatus for storage in the shared memory; the main processing unit is operable to initiate a transfer of the encrypted data from the shared memory to the given attached processing unit such that the encrypted data is input into the decryption unit; and the decryption unit of the given attached processing unit is operable to decrypt the encrypted data using the key of the given attached processing unit such that the data is stored in the local memory of the given attached processing unit.

In a further alternative, the data is a decryption program; an un-secure entity, not authorized to use the key of a given attached processing unit, encrypts the decryption program using a first symmetric key, provides the encrypted decryption program to the secure entity, and provides an ID associated with a given attached processing unit to the secure entity; and the secure entity decrypts the encrypted decryption program provided by the un-secure entity using a second symmetric key, and encrypts the decryption program and the second symmetric key using the key of the given attached processing unit that is associated with the ID received from the un-secure entity. The un-secure entity preferably encrypts the decryption program and the ID of the given attached processor unit using the first symmetric key and provides the encrypted decryption program/ID to the secure entity.

Preferably, the secure entity is operable to encrypt the encrypted decryption program and the second symmetric key using the second symmetric key and provide the encrypted-encrypted decryption program/second symmetric key to the un-secure entity; the un-secure entity is operable to decrypt the encrypted-encrypted decryption program/second symmetric key using the first symmetric key to obtain the encrypted decryption program/second symmetric key produced using the key of the given attached processing unit, and to provide the encrypted decryption program/second symmetric key to the apparatus for storage in the shared memory; the main processing unit is operable to initiate a transfer of the encrypted decryption program/second symmetric key from the shared memory to the given attached processing unit such that the encrypted decryption program/second symmetric key is input into the decryption unit; and the decryption unit of the given attached processing unit is operable to decrypt the encrypted decryption program/second symmetric key using the key of the given attached processing unit such that the decryption program and the second symmetric key are stored in the local memory of the given attached processing unit.

Further, the un-secure entity is operable to encrypt data using the first symmetric key and provide the encrypted data to the apparatus for storage in the shared memory. The given attached processing unit is capable of receiving the encrypted data from the shared memory into the local memory bypassing the decryption unit. The given attached processing unit may be in either of the normal mode or the secure mode when the encrypted data is received into the local memory from the shared memory. The given attached processing unit is operable to decrypt the encrypted data using the decryption program and the second symmetric key. The main processing unit is operable to initiate the transfer of the encrypted data from the shared memory into the local memory of the given attached processing unit bypassing the decryption unit.

Other aspects, features, and advantages of the invention will become apparent to one skilled in the art when the description herein is taken in conjunction with the accompanying drawings.

DESCRIPTION OF THE DRAWINGS

For the purposes of illustration, there are forms shown in the drawings that are presently preferred, it being understood, however, that the invention is not limited to the precise arrangements and instrumentalities shown.

DETAILED DESCRIPTION OF THE PREFERRED EMBODIMENTS

Figure 1:
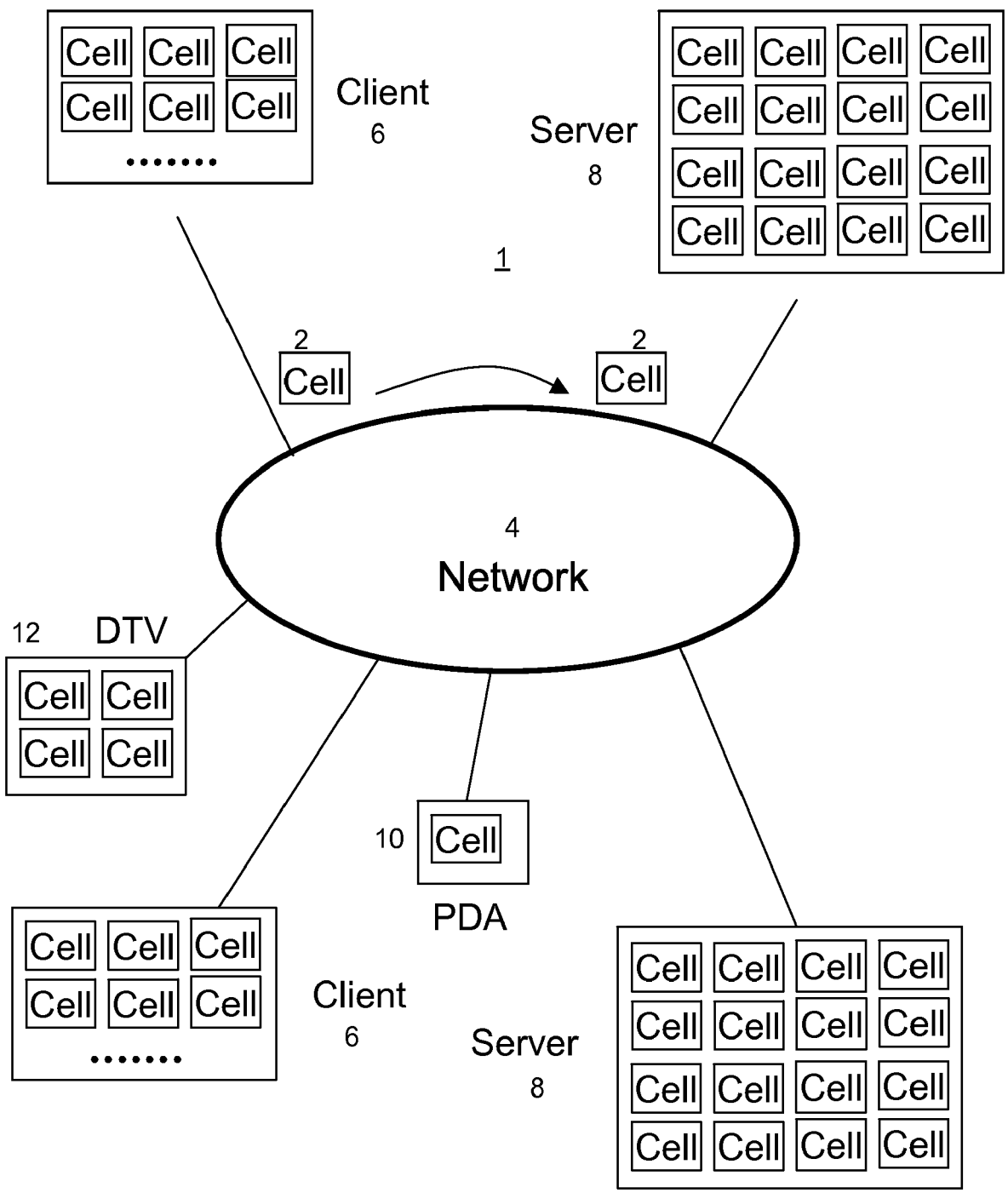
FIG. 1 illustrates the overall architecture of an exemplary computer network in accordance with one or more aspects of the present invention.

The overall architecture for a computer system 1 in accordance with the present invention is shown in FIG. 1. System 1 includes network 4 to which is connected a plurality of computers and computing devices. Network 4 can be a LAN, a global network, such as the Internet, or any other computer network.

The computers and computing devices connected to network 4 (the network's "members") include, e.g., client computers 6, server computers 8, personal digital assistants (PDAs) 10, digital television (DTV) 12 and other wired or wireless computers and computing devices. The processors employed by the members of network 4 are constructed from the same common computing module. These processors also preferably all have the same ISA and perform processing in accordance with the same instruction set. The number of modules included within any particular processor depends upon the processing power required by that processor.

For example, since servers 8 of system 1 perform more processing of data and applications than clients 6, servers 8 contain more computing modules than clients 6. PDAs 10, on the other hand, in this example perform the least amount of processing. PDAs 10, therefore, contain the smallest number of computing modules. DTV 12 performs a level of processing between that of clients 6 and servers 8. DTV 12, therefore, contains a number of computing modules between that of clients 6 and servers 8. As discussed below, each computing module contains a processing controller and a plurality of identical processing units for performing parallel processing of the data and applications transmitted over network 4.

This homogeneous configuration for system 1 facilitates adaptability, processing speed and processing efficiency. Because each member of system 1 performs processing using one or more (or some fraction) of the same computing module, the particular computer or computing device performing the actual processing of data and applications is unimportant. The processing of a particular application and data, moreover, can be shared among the network's members. By uniquely identifying the cells comprising the data and applications processed by system 1 throughout the system, the processing results can be transmitted to the computer or computing device requesting the processing regardless of where this processing occurred. Because the modules performing this processing have a common structure and employ a common ISA, the computational burdens of an added layer of software to achieve compatibility among the processors is avoided. This architecture and programming model facilitates the processing speed necessary to execute, e.g., real-time, multimedia applications.

To take further advantage of the processing speeds and efficiencies facilitated by system 1, the data and applications processed by this system are packaged into uniquely identified, uniformly formatted software cells 2. Each software cell 2 contains, or can contain, both applications and data. Each software cell also contains an ID to globally identify the cell throughout network 4 and system 1. This uniformity of structure for the software cells, and the software cells' unique identification throughout the network, facilitates the processing of applications and data on any computer or computing device of the network. For example, a client 6 may formulate a software cell 2 but, because of the limited processing capabilities of client 6, transmit this software cell to a server 8 for processing. Software cells 2 can migrate, therefore, throughout network 4 for processing on the basis of the availability of processing resources on the network 4.

The homogeneous structure of processors and software cells 2 of system 1 also avoids many of the problems of today's heterogeneous networks. For example, inefficient programming models which seek to permit processing of applications on any ISA using any instruction set, e.g., virtual machines such as the Java virtual machine, are avoided. System 1, therefore, can implement broadband processing far more effectively and efficiently than conventional networks.

Figure 2:
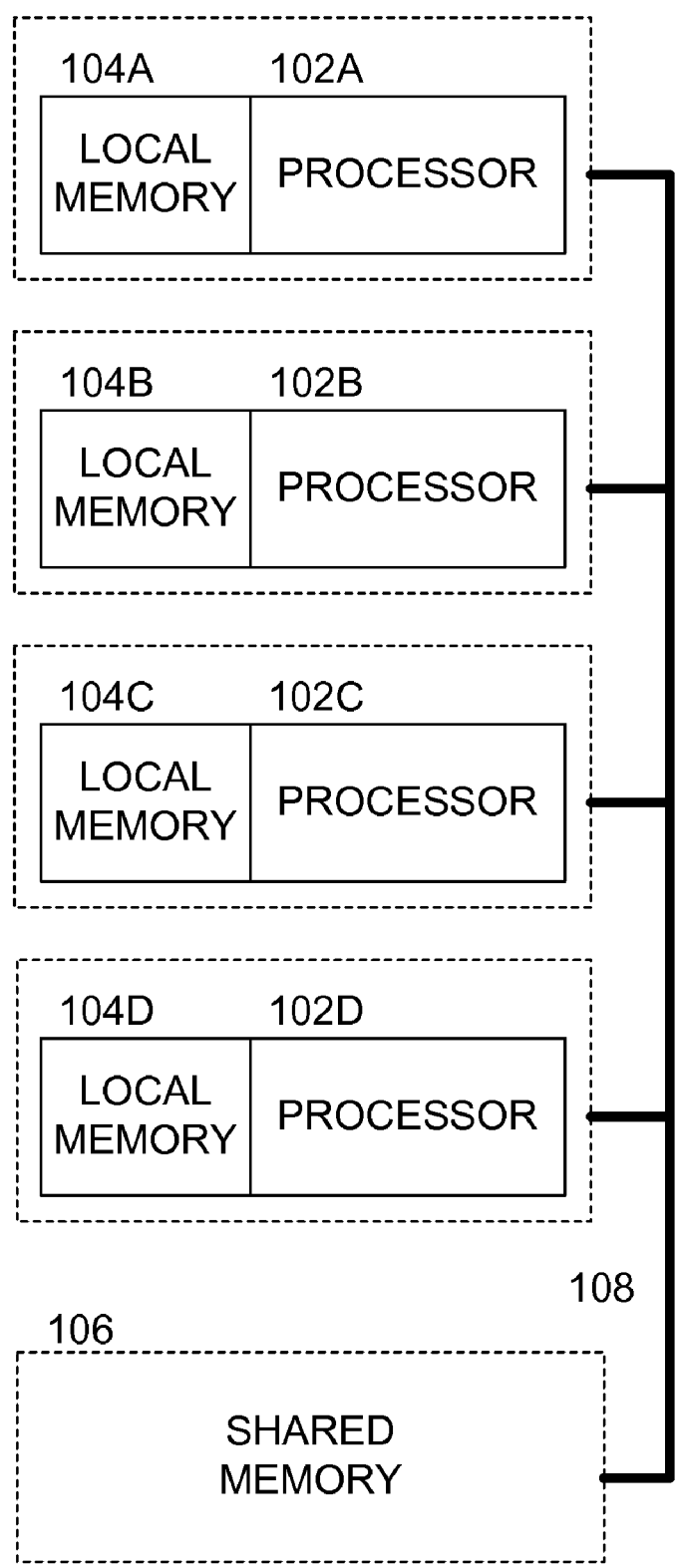
FIG. 2 is a block diagram illustrating a multi-processor system in accordance with one or more aspects of the present invention.

With reference to FIG. 2 at least a portion of a processing system 100 is shown that may be adapted for carrying out one or more features of the present invention. For the purposes of brevity and clarity, the block diagram of FIG. 2 will be referred to and described herein as illustrating an apparatus 100, it being understood, however, that the description may readily be applied to various aspects of a method with equal force.

The processing system 100 includes a plurality of processors 102A, 102B, 102C, and 102D, it being understood that any number of processors may be employed without departing from the spirit and scope of the invention. The processing system 100 also includes a plurality of local memories 104A, 104B, 104C, 104D and a shared memory 106. At least the processors 102, the local memories 104, and the shared memory 106 are preferably (directly or indirectly) coupled to one another over a bus system 108 that is operable to transfer data to and from each component in accordance with suitable protocols.

Each of the processors 102 may be of similar construction or of differing construction. The processors may be implemented utilizing any of the known technologies that are capable of requesting data from the shared (or system) memory 106, and manipulating the data to achieve a desirable result. For example, the processors 102 may be implemented using any of the known microprocessors that are capable of executing software and/or firmware, including standard microprocessors, distributed microprocessors, etc. By way of example, one or more of the processors 102 may be a graphics processor that is capable of requesting and manipulating data, such as pixel data, including gray scale information, color information, texture data, polygonal information, video frame information, etc.

One or more of the processors 102 of the system 100 may take on the role as a main (or managing) processor. The main processor may schedule and orchestrate the processing of data by the other processors.

The system memory 106 is preferably a dynamic random access memory (DRAM) coupled to the processors 102 through a memory interface circuit (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 preferably includes a processor core and an associated one of the local memories 104 in which to execute programs. These components may be integrally disposed on a common semi-conductor substrate or may be separately disposed as may be desired by a designer. The processor core is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processor core may include an instruction buffer, instruction decode circuitry, dependency check circuitry, instruction issue circuitry, and execution stages.

Each local memory 104 is coupled to its associated processor core 102 via a bus and is preferably located on the same chip (same semiconductor substrate) as the processor core. The local memory 104 is preferably not a traditional hardware cache memory in that there are no on-chip or off-chip hardware cache circuits, cache registers, cache memory controllers, etc. to implement a hardware cache memory function. As on chip space is often limited, the size of the local memory may be much smaller than the shared memory 106.

The processors 102 preferably provide data access requests to copy data (which may include program data) from the system memory 106 over the bus system 108 into their respective local memories 104 for program execution and data manipulation. The mechanism for facilitating data access may be implemented utilizing any of the known techniques, for example the direct memory access (DMA) technique. This function is preferably carried out by the memory interface circuit.

Figure 3:
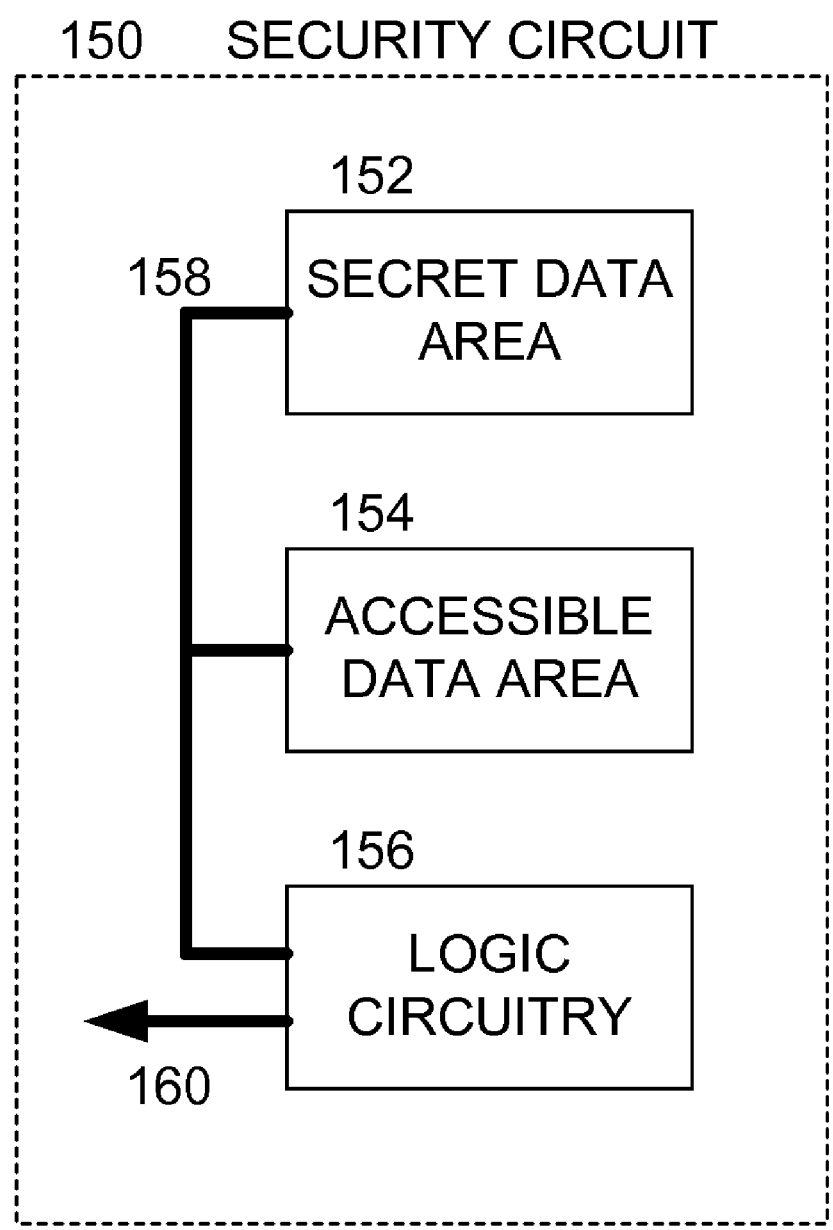
FIG. 3 is a block diagram illustrating the structure of a security circuit of the system of FIG. 2 in accordance with one or more aspects of the present invention.

With reference to FIG. 3, one or more of the processors 102 also preferably includes a security circuit 150 that is operable to place the processor 102 into a least one of a plurality of operational modes. The security circuit 150 includes a secret data area 152, an accessible data area 154, and a logic circuit 156. The secret data area 152 is preferably not accessible by any devices outside the security circuit 150. The accessible data area 154 is preferably accessible by devices outside the security circuit 150. The secret data area 152 and/or the accessible data area 154 may be implemented as respective portions of the local memory 406, respective registers, and/or respective other storage devices, such as ROMs or the like.

Preferably, a first key, KEY 1, and a second key, KEY 2 are stored in the secret data area 152 of the security circuit 150 in a controlled process prior to use of the processor 102, whereby security is maintained. Indeed, it is contemplated that KEY 1 and KEY 2 are to be utilized in order to authenticate the processor 102 and qualify it as a trusted device. Therefore, it is desirable that KEY 1 and KEY 2 remain secret and within the control of authorized parties when the processor 102 is in use and prior to use, such as during manufacturing.

The secret data area 152, the accessible data area 154, and the logic circuit 156 are preferably coupled to one another over connection lines 158, which may be implemented utilizing a bus configuration. The logic circuit 156 is preferably coupled to the registers 410 by way of one or more data lines 160, which may also be implemented utilizing a bus configuration.

As mentioned above, the security circuit 150 is preferably operable to place the processor 102 into at least one of a plurality of operational modes. These modes preferably include a first mode (normal mode), whereby the processor 102 and any external device or devices may initiate a transfer of information into or out of the processor 102, e.g., into or out of the local memory 104. The operational modes also preferably include a second mode (isolated mode), whereby neither the processor 102 nor any external device or devices may initiate a transfer of information into or out of the processor 102. The operational modes also preferably include a third mode (secure mode), whereby the processor 102 may initiate a transfer of information into or out of the processor 102, but any external device or devices may not initiate a transfer of information into or out of the processor 102.

Figure 4A:
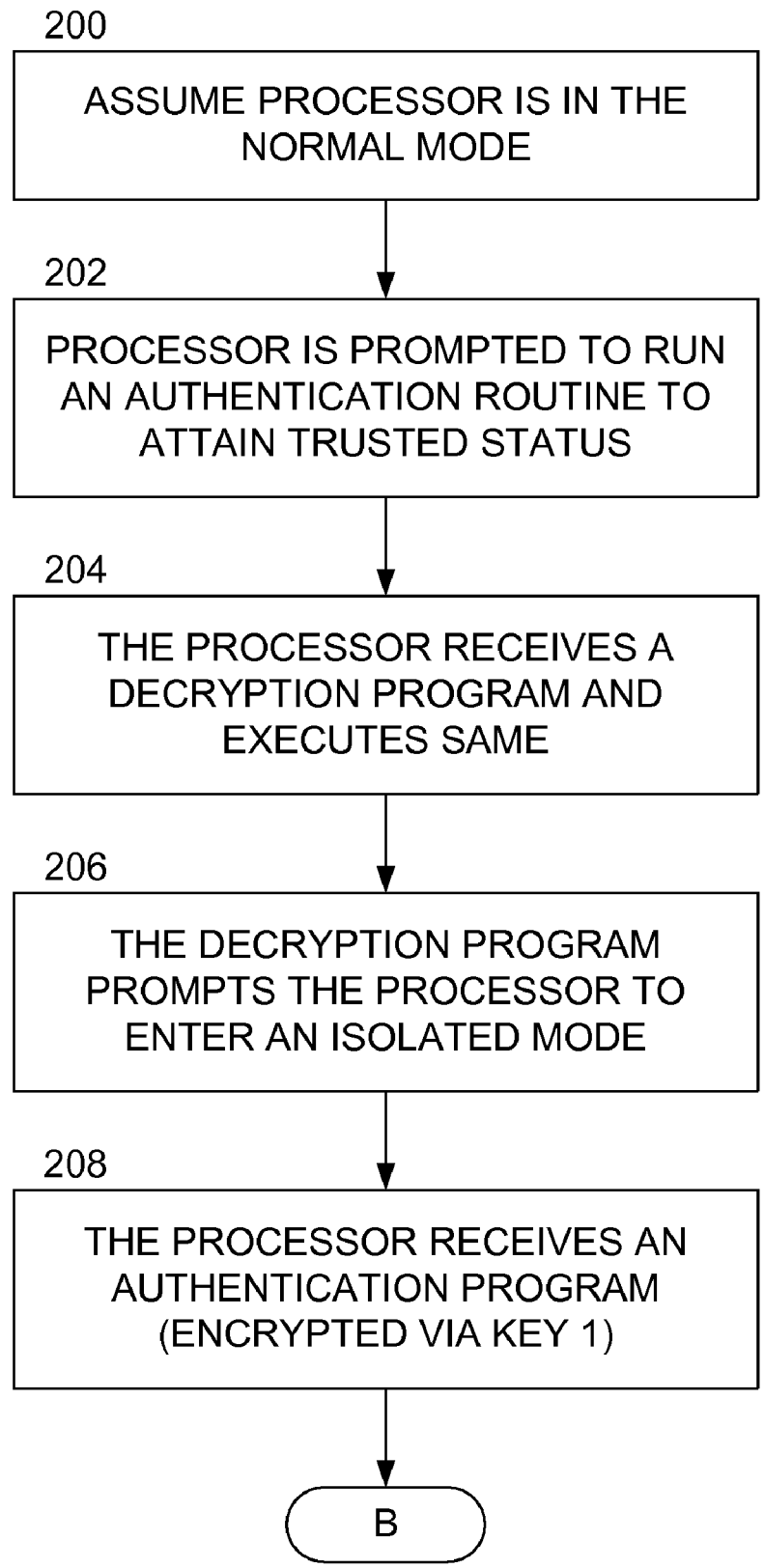
FIGS. 4A-C are flow diagrams illustrating process steps that may be carried out by the system of FIG. 2 to achieve an authentication routine in accordance with one or more aspects of the present invention.
Figure 4B:
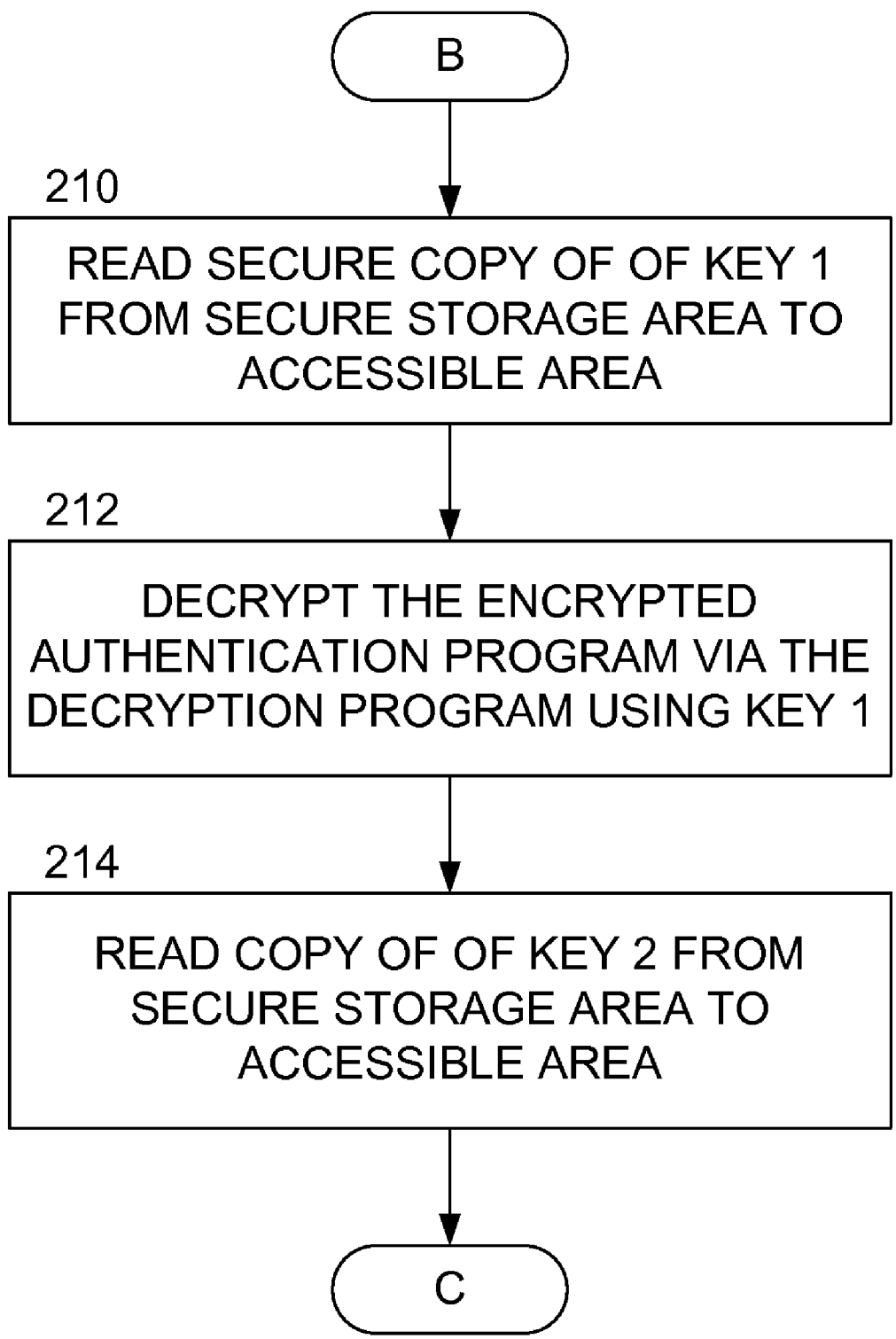
Figure 4C:
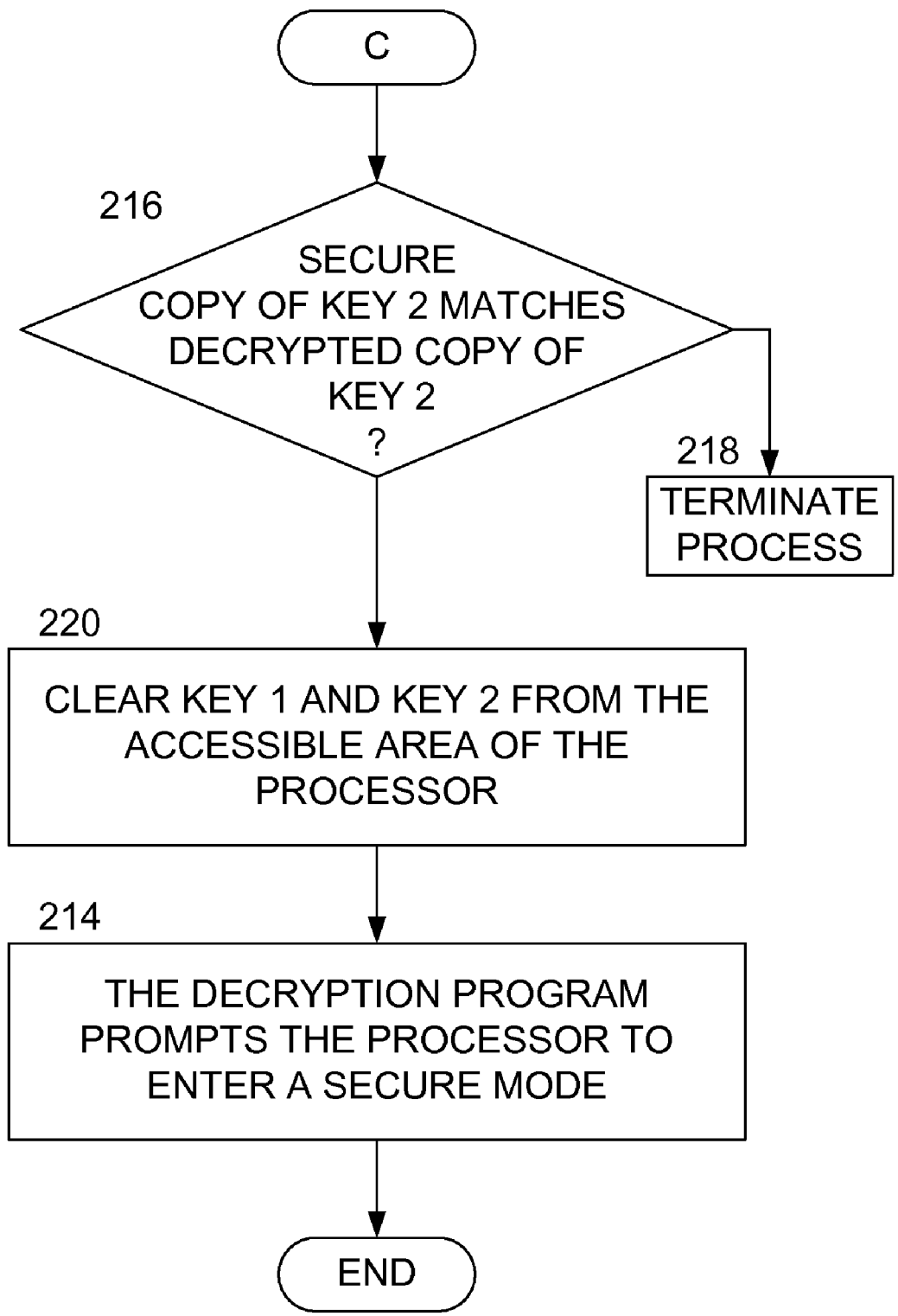
Figure 5:
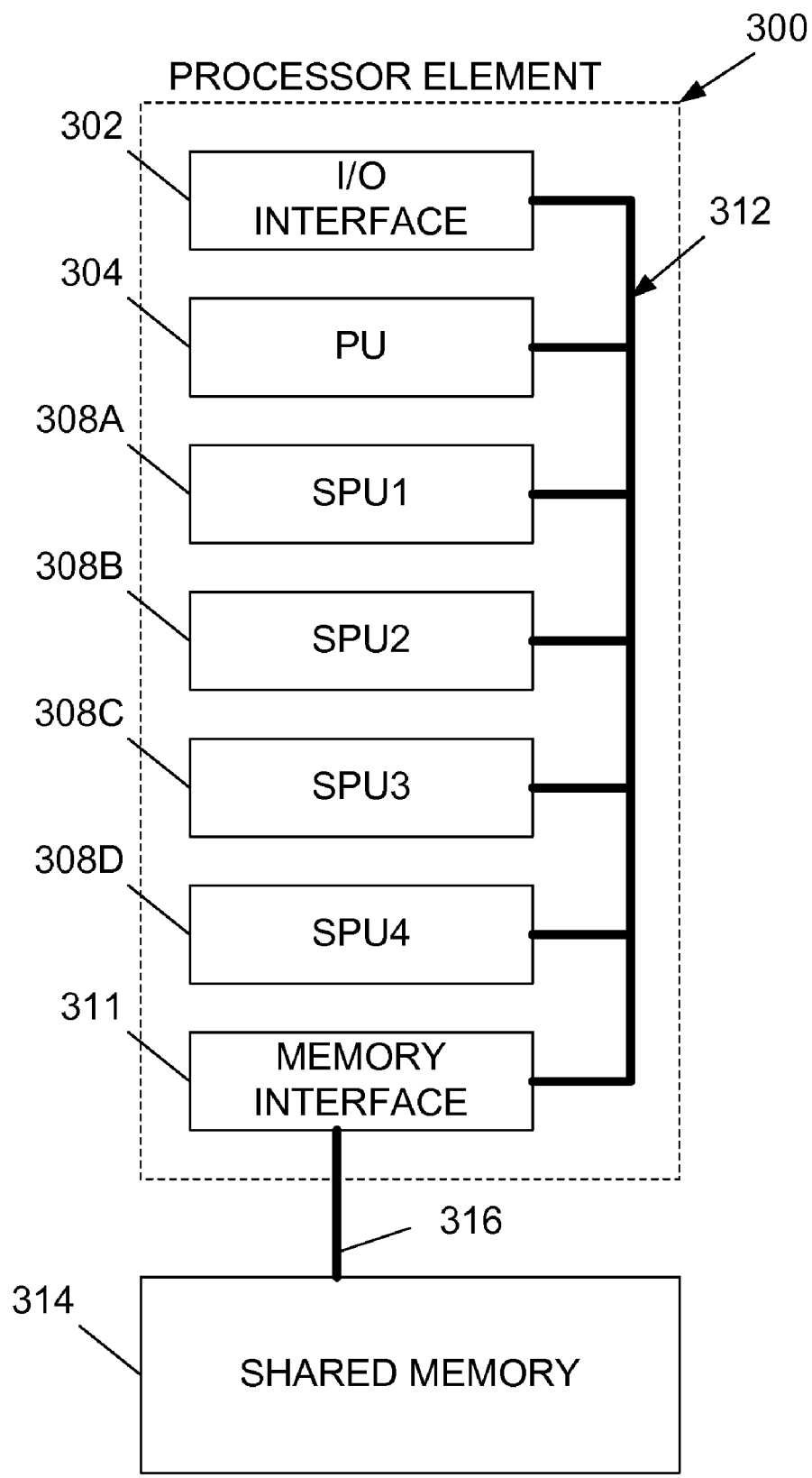
FIG. 5 is a block diagram illustrating a preferred processor element (PE) that may be used to implement one or more further aspects of the present invention.

The operation of the security circuit 150 may be better understood with reference to FIGS. 4A-C, which are flow diagrams illustrating certain security capabilities of the processor 102 in accordance with the present invention. In this regard, it is assumed that the processor 102 will default into the first, normal mode of operation (action 200). Recall that in the first mode, the processor 102 and any external device or devices (such as another processor), may initiate a transfer of information into or out of the local memory 104 of the processor 102. It is noted that in alternative embodiments of the invention the processor 102 may not enter the first mode of operation upon initialization (e.g., power up) or may only enter that mode for a relatively short time in favor of the second or the third mode of operation as will be discussed below.

At action 202, the processor 102 may run an authentication routine in order to attain a trusted status. The authentication routine may be initiated by way of a call from an application program running on the processor 102 or by way of a call from a program running externally to the processor 102 (action 202) In an alternative embodiment of the invention, the processor 102 may run the authentication routine upon initialization or shortly thereafter as a default condition without requiring a call from an application program. In response to initiating the authentication routine, the processor 102 preferably executes a decryption program. It is noted that the decryption program may be obtained from an appropriate memory within a module in which the processor 102 is disposed, or it may be obtained from a source external to the module. Examples of such external sources include an appropriate memory that may be contained within a larger system in which the module is disposed, or another device coupled to the network 4, such as a server 8 (FIG. 1) performing administrative functions or the like. In one or more embodiments of the invention, the decryption program may be contained in a secure, non-volatile ROM, such as a flash ROM.

At action 206, prior to, during, or as a result of executing the decryption program by the processor 102, the processor 102 preferably enters the second, isolated mode of operation. Recall that in the second mode of operation, neither the processor 102 nor any external device or devices may initiate a transfer of information into or out of the local memory 104.

At action 208, the processor 102 preferably receives an authentication program that is utilized during the authentication routine. It is noted that the timing of when the encrypted authentication program is received by the processor 102 is not rigid; indeed, the program may be received at any appropriate time prior to, or during, the execution of the authentication routine. The authentication program is preferably encrypted in accordance with KEY 1 such that it may only be utilized in authorized ways. Further, the authentication program preferably includes a KEY 2, which identifies the authentication program. For example, KEY 2 may be a serial number, a hash result, etc.

Preferably, the encrypted authentication program is stored within an appropriate memory within the processor 102, a module containing the processor 102, or within a memory external to the processor 102 or module. It is most preferable that the encrypted authentication program is stored within a memory outside a module containing the processor 102, but within a device in which the module is contained. It is also preferred that the encryption of the authentication program and the storage of same in the appropriate memory is conducted in a controlled process by an authorized entity. Indeed, it is desirable that the integrity of the authentication program is maintained at all times in order to ensure that its use in authenticating the processor 102 or any program thereof is effective. In one or more embodiments of the invention, the authentication program may be contained in a secure, non-volatile ROM, such as a flash ROM.

At action 210, the execution of the decryption program preferably causes a secure copy of KEY 1 to be read from the secret data area 152 and stored in the accessible data area 154 within the security circuit 150. By way of example, the logic circuit 156 is preferably operable to transfer a copy of KEY 1 from the secret data area 152 to the accessible data area 154 in response to the existence of particular data within registers of the processor 102 (not shown). Since the processor 102 is in the second, isolated mode, the existence of a copy of KEY 1 within the accessible data area 154 does not represent a breach of security. Indeed, neither the processor 102 nor any external device may initiate the transfer of KEY 1 out of the processor 102 through the local memory 104 or otherwise.

At action 212, the decryption program preferably utilizes KEY 1 to decrypt the encrypted authentication program such that it may be executed by the processor 102. During execution of the authentication program, a copy of KEY 2 contained within the secret data area 152 is preferably written into the accessible data area 154. By way of example, the logic circuit 156 is preferably operable to transfer a copy of KEY 2 from the secret data area 152 to the accessible data area 154 in response to certain data that may be written into the registers in accordance with the authentication program.

At action 216, a determination is preferably made as to whether the copy of KEY 2 within the accessible data area 154 matches the copy of KEY 2 contained within the authentication program. Recall that the authentication program contains a copy of KEY 2, which is made available when the authentication program is decrypted (action 212). By way of example, the copy of KEY 2 contained within the authentication program may be temporarily stored within local memory 104 or may be written into the accessible data area 154 in accordance with the execution of the authentication program itself. Again, this does not represent a breach in security inasmuch as the processor 102 is in the isolated mode during this process, and therefore, no unauthorized device outside the processor 102 may obtain a copy of KEY 2.

If the copy of KEY 2 contained within the authentication program does not match the copy of KEY 2 obtained from the secret data area 152, then the process of authenticating the processor 102 terminates (action 218). When these copies of KEY 2 match, however, the copies of KEY 1 and KEY 2 contained within the accessible data area 154 are preferably cleared (action 220) and the processor 102 preferably enters the third, secure mode of operation (action 222). By way of example, the logic circuit 156 may clear the copies of KEY 1 and KEY 2 from the accessible data area 154 and may cause the processor 102 to enter the third secure mode of operation.

Recall that in the third, secure mode of operation, the processor 102 may initiate the transfer of information into or out of the local memory 104. Stated another way, in the third, secure mode of operation, the processor 102 may initiate the transfer of information into or out of the processor 102, but any devices external to the processor 102 may not initiate such transfer of information. Once the processor 102 has entered the third, secure mode of operation, it is considered a trusted device that may carry out operations and manipulate data without fear that unauthorized entities may obtain such data. Indeed, even other processors cannot gain access to data within the processor 102 without being initiated by the processor 102 itself.

Advantageously, a trusted processor 102 may provide many useful functions, such as within a distributed system as illustrated in FIG. 1. These functions include providing a secure external memory controller having a memory area that can only be accessed by authorized devices, a secure clock device that may only be modified by authorized devices, a trusted request mechanism, and a secure processing element capable of authenticating boot code (e.g., using public-key based authentication, etc.).

In accordance with one or more aspects of the invention, the trusted processor 102 may be used by other processors 102 including a main processor to conduct decryption operations. By way of example, one of the processor 102 may seek to have data that is stored in the main memory 106 decrypted by the trusted processor 102. Thus, the processor may send a request to the trusted processor 102 indicating at least one of where the data are located in the main memory 106 and parameters indicating what decryption routine is to be performed. (Alternatively, the decryption routine may be predetermined and thus such parameters may be omitted.) In response to the request, the trusted processor 102 may read the encrypted data from the main memory 106 into its local memory 104 and execute the decryption process. If the trusted processor 102 was not in possession of a decryption key (such as KEY 1 or KEY 2) prior to the request by the other processor 102, then such decryption key or information as to how to obtain such key is preferably also provided by the requesting processor 102. The decrypted data are then preferably written back into the main memory 106 and/or written into the local memory 104 of the requesting processor 102.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

With reference to FIG. 3, the basic processing module is a processor element (PE) 300. The PE 300 comprises an I/O interface 302, a processing unit (PU) 304, and a plurality of sub-processing units 308, namely, sub-processing unit 308A, sub-processing unit 308B, sub-processing unit 308C, and sub-processing unit 308D. A local (or internal) PE bus 312 transmits data and applications among the PU 304, the sub-processing units 308, and a memory interface 311. The local PE bus 312 can have, e.g., a conventional architecture or can be implemented as a packet-switched network. If implemented as a packet switch network, while requiring more hardware, increases the available bandwidth.

The PE 300 can be constructed using various methods for implementing digital logic. The PE 300 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 300 also may be implemented using superconducting material, e.g., rapid single-flux-quantum (RSFQ) logic.

The PE 300 is closely associated with a shared (main) memory 314 through a high bandwidth memory connection 316. Although the memory 314 preferably is a dynamic random access memory (DRAM), the memory 314 could be implemented using other means, e.g., as a static random access memory (SRAM), a magnetic random access memory (MRAM), an optical memory, a holographic memory, etc.

The PU 304 and the sub-processing units 308 are preferably each coupled to a memory flow controller (MFC) including direct memory access DMA functionality, which in combination with the memory interface 311, facilitate the transfer of data between the DRAM 314 and the sub-processing units 308 and the PU 304 of the PE 300. It is noted that the DMAC and/or the memory interface 311 may be integrally or separately disposed with respect to the sub-processing units 308 and the PU 304. Indeed, the DMAC function and/or the memory interface 311 function may be integral with one or more (preferably all) of the sub-processing units 308 and the PU 304. It is also noted that the DRAM 314 may be integrally or separately disposed with respect to the PE 300. For example, the DRAM 314 may be disposed off-chip as is implied by the illustration shown or the DRAM 314 may be disposed on-chip in an integrated fashion.

The PU 304 can be, e.g., a standard processor capable of stand-alone processing of data and applications. In operation, the PU 304 preferably schedules and orchestrates the processing of data and applications by the sub-processing units. The sub-processing units preferably are single instruction, multiple data (SIMD) processors. Under the control of the PU 304, the sub-processing units perform the processing of these data and applications in a parallel and independent manner. The PU 304 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 304 may be implemented by one of the sub-processing units 308 taking on the role of a main processing unit that schedules and orchestrates the processing of data and applications by the sub-processing units 308. Further, there may be more than one PU implemented within the processor element 300.

In accordance with this modular structure, the number of PEs 300 employed by a particular computer system is based upon the processing power required by that system. For example, a server may employ four PEs 300, a workstation may employ two PEs 300 and a PDA may employ one PE 300. The number of sub-processing units of a PE 300 assigned to processing a particular software cell depends upon the complexity and magnitude of the programs and data within the cell.

Figure 6:
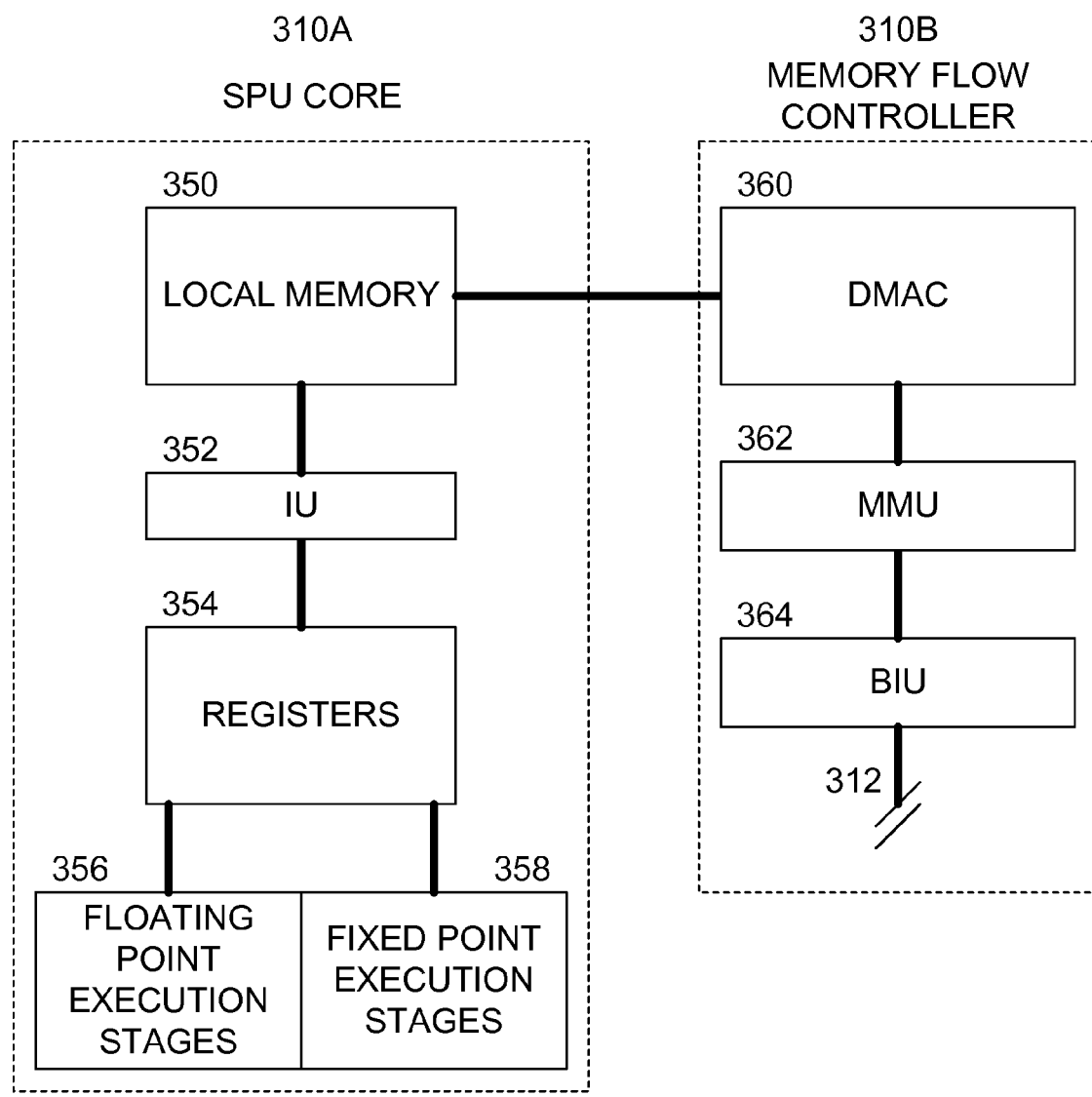
FIG. 6 is a block diagram illustrating the structure of an exemplary sub-processing unit (SPU) of the system of FIG. 5 that may be adapted in accordance with one or more further aspects of the present invention.

FIG. 6 illustrates the preferred structure and function of a sub-processing unit (SPU) 308. The SPU 308 architecture preferably fills a void between general-purpose processors (which are designed to achieve high average performance on a broad set of applications) and special-purpose processors (which are designed to achieve high performance on a single application). The SPU 308 is designed to achieve high performance on game applications, media applications, broadband systems, etc., and to provide a high degree of control to programmers of real-time applications. Some capabilities of the SPU 308 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 308 includes two basic functional units, namely an SPU core 310A and a memory flow controller (MFC) 310B. The SPU core 310A performs program execution, data manipulation, etc., while the MFC 310B performs functions related to data transfers between the SPU core 310A and the DRAM 314 of the system.

The SPU core 310A includes a local memory 350, an instruction unit (IU) 352, registers 354, one or more floating point execution stages 356 and one or more fixed point execution stages 358. The local memory 350 is preferably implemented using single-ported random access memory, such as an SRAM. Whereas most processors reduce latency to memory by employing caches, the SPU core 310A implements the relatively small local memory 350 rather than a cache. Indeed, in order to provide consistent and predictable memory access latency for programmers of real-time applications (and other applications as mentioned herein) a cache memory architecture within the SPU 308A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 350 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 308 references the associated local memory 350 using a local address, however, each location of the local memory 350 is also assigned a real address (RA) within the overall system's memory map. This allows Privilege Software to map a local memory 350 into the Effective Address (EA) of a process to facilitate DMA transfers between one local memory 350 and another local memory 350. The PU 304 can also directly access the local memory 350 using an effective address. In a preferred embodiment, the local memory 350 contains 356 kilobytes of storage, and the capacity of registers 354 is 128×128 bits.

The SPU core 304A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 352 includes an instruction buffer, instruction decode circuitry, dependency check circuitry, and instruction issue circuitry.

The instruction buffer preferably includes a plurality of registers that are coupled to the local memory 350 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 350, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 356 and/or the fixed point execution stages 358.

The registers 354 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 310A is of a superscalar architecture, such that more than one instruction is issued per clock cycle. The SPU core 310A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 356 and fixed point execution stages 358 may be employed. In a preferred embodiment, the floating point execution stages 356 operate at a speed of 32 billion floating point operations per second (32 GFLOPS), and the fixed point execution stages 358 operate at a speed of 32 billion operations per second (32 GOPS).

The MFC 310B preferably includes a bus interface unit (BIU) 364, a memory management unit (MMU) 362, and a direct memory access controller (DMAC) 360. With the exception of the DMAC 360, the MFC 310B preferably runs at half frequency (half speed) as compared with the SPU core 310A and the bus 312 to meet low power dissipation design objectives. The MFC 310B is operable to handle data and instructions coming into the SPU 308 from the bus 312, provides address translation for the DMAC, and snoop-operations for data coherency. The BIU 364 provides an interface between the bus 312 and the MMU 362 and DMAC 360. Thus, the SPU 308 (including the SPU core 310A and the MFC 310B) and the DMAC 360 are connected physically and/or logically to the bus 312.

The MMU 362 is preferably operable to translate effective addresses (taken from DMA commands) into real addresses for memory access. For example, the MMU 362 may translate the higher order bits of the effective address into real address bits. The lower-order address bits, however, are preferably untranslatable and are considered both logical and physical for use to form the real address and request access to memory. In one or more embodiments, the MMU 362 may be implemented based on a 64-bit memory management model, and may provide $2^{64}$ bytes of effective address space with 4K-, 64K-, 1M-, and 16M-byte page sizes and 256 MB segment sizes. Preferably, the MMU 362 is operable to support up to $2^{65}$ bytes of virtual memory, and $2^{42}$ bytes (4 TeraBytes) of physical memory for DMA commands. The hardware of the MMU 362 may include an 8-entry, fully associative SLB, a 256-entry, 4way set associative TLB, and a 4×4 Replacement Management Table (RMT) for the TLB—used for hardware TLB miss handling.

The DMAC 360 is preferably operable to manage DMA commands from the SPU core 310A and one or more other devices such as the PU 304 and/or the other SPUs. There may be three categories of DMA commands: Put commands, which operate to move data from the local memory 350 to the shared memory 314; Get commands, which operate to move data into the local memory 350 from the shared memory 314; and Storage Control commands, which include SLI commands and synchronization commands. The synchronization commands may include atomic commands, send signal commands, and dedicated barrier commands. In response to DMA commands, the MMU 362 translates the effective address into a real address and the real address is forwarded to the BIU 364.

The SPU core 310A preferably uses a channel interface and data interface to communicate (send DMA commands, status, etc.) with an interface within the DMAC 360. The SPU core 310A dispatches DMA commands through the channel interface to a DMA queue in the DMAC 360. Once a DMA command is in the DMA queue, it is handled by issue and completion logic within the DMAC 360. When all bus transactions for a DMA command are finished, a completion signal is sent back to the SPU core 310A over the channel interface.

Figure 7:
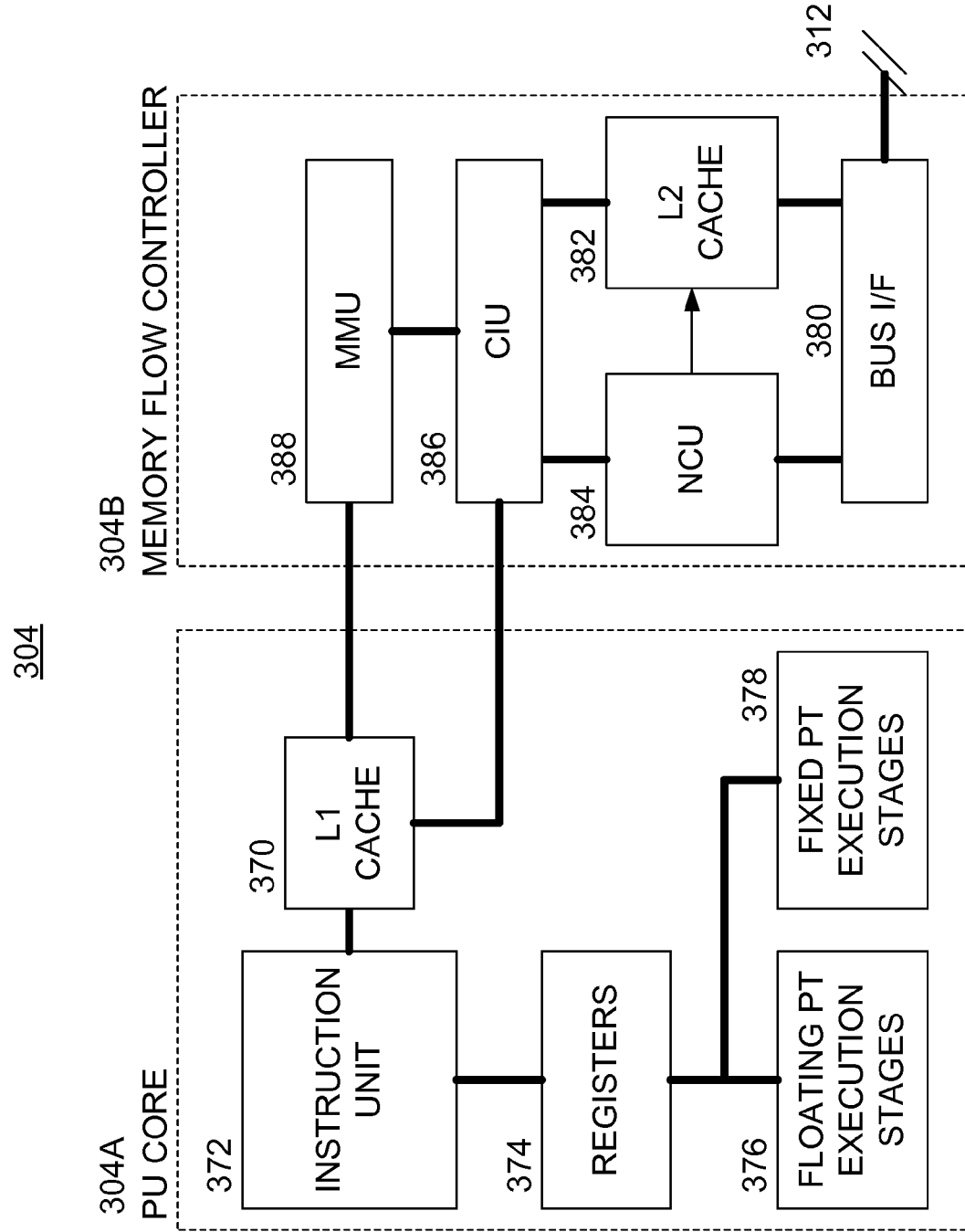
FIG. 7 is a block diagram illustrating the structure of an exemplary processing unit (PU) of the system of FIG. 5 that may be adapted in accordance with one or more further aspects of the present invention.

FIG. 7 illustrates the preferred structure and function of the PU 304. The PU 304 includes two basic functional units, the PU core 304A and the memory flow controller (MFC) 304B. The PU core 304A performs program execution, data manipulation, multi-processor management functions, etc., while the MFC 304B performs functions related to data transfers between the PU core 304A and the memory space of the system 100.

The PU core 304A may include an L1 cache 370, an instruction unit 372, registers 374, one or more floating point execution stages 376 and one or more fixed point execution stages 378. The L1 cache provides data caching functionality for data received from the shared memory 106, the processors 102, or other portions of the memory space through the MFC 304B. As the PU core 304A is preferably implemented as a superpipeline, the instruction unit 372 is preferably implemented as an instruction pipeline with many stages, including fetching, decoding, dependency checking, issuing, etc. The PU core 304A is also preferably of a superscalar configuration, whereby more than one instruction is issued from the instruction unit 372 per clock cycle. To achieve a high processing power, the floating point execution stages 376 and the fixed point execution stages 378 include a plurality of stages in a pipeline configuration. Depending upon the required processing power, a greater or lesser number of floating point execution stages 376 and fixed point execution stages 378 may be employed.

The MFC 304B includes a bus interface unit (BIU) 380, an L2 cache memory, a non-cachable unit (NCU) 384, a core interface unit (CIU) 386, and a memory management unit (MMU) 388. Most of the MFC 304B runs at half frequency (half speed) as compared with the PU core 304A and the bus 108 to meet low power dissipation design objectives.

The BIU 380 provides an interface between the bus 108 and the L2 cache 382 and NCU 384 logic blocks. To this end, the BIU 380 may act as a Master as well as a Slave device on the bus 108 in order to perform fully coherent memory operations. As a Master device it may source load/store requests to the bus 108 for service on behalf of the L2 cache 382 and the NCU 384. The BIU 380 may also implement a flow control mechanism for commands which limits the total number of commands that can be sent to the bus 108. The data operations on the bus 108 may be designed to take eight beats and, therefore, the BIU 380 is preferably designed around 128 byte cache-lines and the coherency and synchronization granularity is 128 KB.

The L2 cache memory 382 (and supporting hardware logic) is preferably designed to cache 312 KB of data. For example, the L2 cache 382 may handle cacheable loads/stores, data pre-fetches, instruction fetches, instruction pre-fetches, cache operations, and barrier operations. The L2 cache 382 is preferably an 8-way set associative system. The L2 cache 382 may include six reload queues matching six (6) castout queues (e.g., six RC machines), and eight (64-byte wide) store queues. The L2 cache 382 may operate to provide a backup copy of some or all of the data in the L1 cache 370. Advantageously, this is useful in restoring state(s) when processing nodes are hot-swapped. This configuration also permits the L1 cache 370 to operate more quickly with fewer ports, and permits faster cache-to-cache transfers (because the requests may stop at the L2 cache 382). This configuration also provides a mechanism for passing cache coherency management to the L2 cache memory 382.

The NCU 384 interfaces with the CIU 386, the L2 cache memory 382, and the BIU 380 and generally functions as a queueing/buffering circuit for non-cacheable operations between the PU core 304A and the memory system. The NCU 384 preferably handles all communications with the PU core 304A that are not handled by the L2 cache 382, such as cache-inhibited load/stores, barrier operations, and cache coherency operations. The NCU 384 is preferably run at half speed to meet the aforementioned power dissipation objectives.

The CIU 386 is disposed on the boundary of the MFC 304B and the PU core 304A and acts as a routing, arbitration, and flow control point for requests coming from the execution stages 376, 378, the instruction unit 372, and the MMU unit 388 and going to the L2 cache 382 and the NCU 384. The PU core 304A and the MMU 388 preferably run at full speed, while the L2 cache 382 and the NCU 384 are operable for a 2:1 speed ratio. Thus, a frequency boundary exists in the CIU 386 and one of its functions is to properly handle the frequency crossing as it forwards requests and reloads data between the two frequency domains.

The CIU 386 is comprised of three functional blocks: a load unit, a store unit, and reload unit. In addition, a data pre-fetch function is performed by the CIU 386 and is preferably a functional part of the load unit. The CIU 386 is preferably operable to: (i) accept load and store requests from the PU core 304A and the MMU 388; (ii) convert the requests from full speed clock frequency to half speed (a 2:1 clock frequency conversion); (iii) route cachable requests to the L2 cache 382, and route non-cachable requests to the NCU 384; (iv) arbitrate fairly between the requests to the L2 cache 382 and the NCU 384; (v) provide flow control over the dispatch to the L2 cache 382 and the NCU 384 so that the requests are received in a target window and overflow is avoided; (vi) accept load return data and route it to the execution stages 376, 378, the instruction unit 372, or the MMU 388; (vii) pass snoop requests to the execution stages 376, 378, the instruction unit 372, or the MMU 388; and (viii) convert load return data and snoop traffic from half speed to full speed.

The MMU 388 preferably provides address translation for the PU core 340A, such as by way of a second level address translation facility. A first level of translation is preferably provided in the PU core 304A by separate instruction and data ERAT (effective to real address translation) arrays that may be much smaller and faster than the MMU 388.

In a preferred embodiment, the PU 304 operates at 4-6 GHz, 10F04, with a 64-bit implementation. The registers are preferably 64 bits long (although one or more special purpose registers may be smaller) and effective addresses are 64 bits long. The instruction unit 372, registers 374 and execution stages 376 and 378 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

Figure 8:
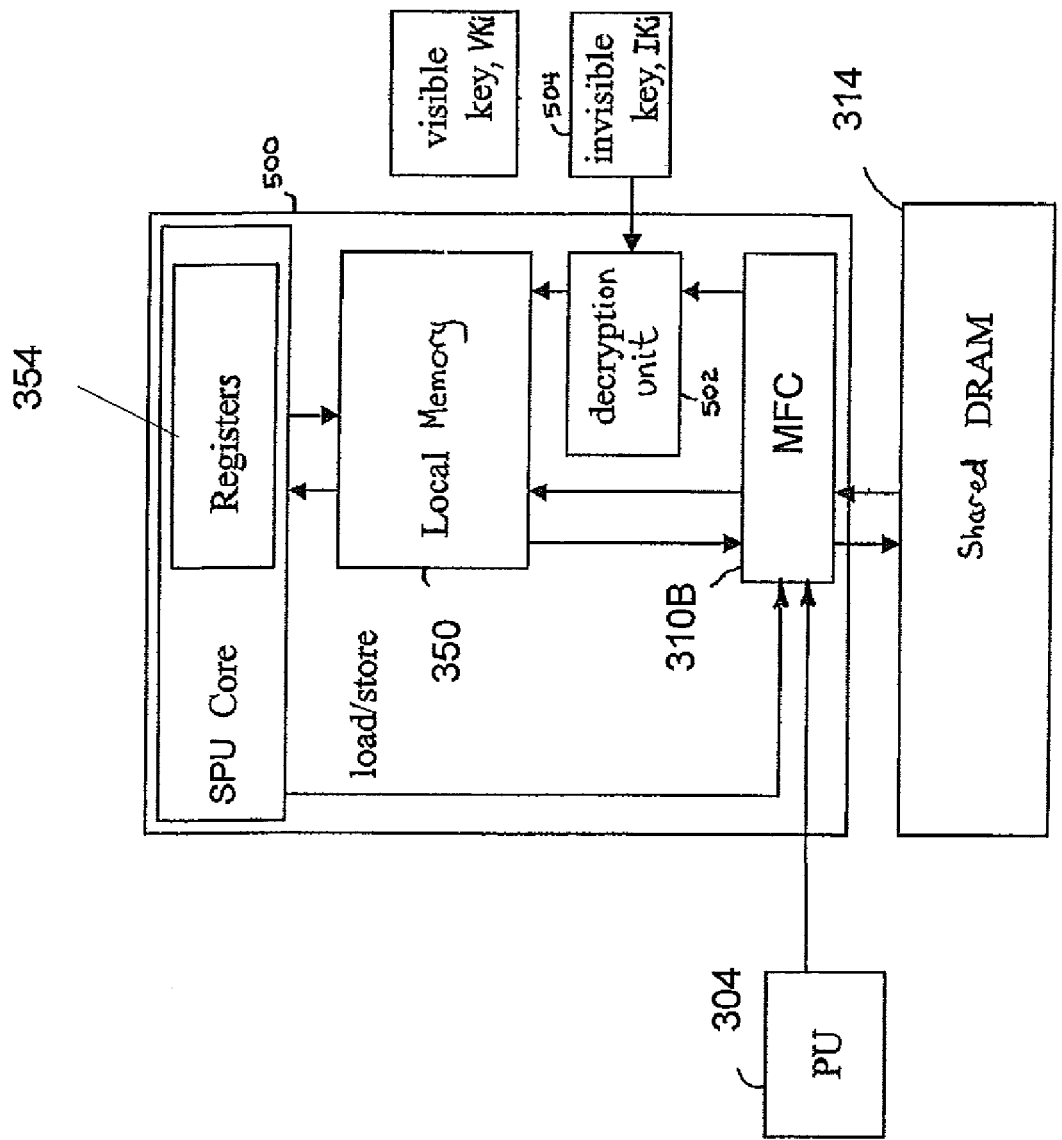
FIG. 8 is a block diagram of a processor having security features in accordance with one or more aspects of the present invention.

Reference is now made to FIG. 8, which is a block diagram of an processor 500 in accordance with one or more further aspects of the present invention. In this embodiment, the processor 500 also includes a decryption unit 502 and a secure memory 504. The secure memory 504 contains an invisible key (IKi), where i represents an i-th processor. The decryption unit 502 is operable to decrypt data (using the invisible key IKi) flowing from the memory flow controller 310B to the local memory 350. Preferably, the invisible key IKi is a substantially unique key to the given processor 500, it being understood that each of the processors in a system would include a unique invisible key. The decryption unit 502 may employ any of the known techniques, such as simple XOR algorithms, or more complex algorithms.

The processor 500 is preferably operable to enter a secure mode of operation, either using the techniques described hereinabove or utilizing other techniques. Preferably, the processor 500 enters the secure mode of operation upon a hardware reset condition or a power-up condition. When in the un-secure mode, the PU 304 is capable of initiating data transfers between the shared DRAM 314 and the local memory 350 without passing through the decryption unit 502. Likewise, the PU 304 is capable of initiating data transfers from the local memory 350 to the shared DRAM 314 when the processor 500 is in the un-secure mode. When in the secure mode, however, the PU 304 is not capable of initiating data transfers from the shared DRAM 314 to the local memory 350 without passing such data through the decryption unit 502. Data transfers initiated by the PU 304 from the local memory 350 are not permitted in the secure mode. Thus, any data transfer initiated by the PU 304 (or any other external entity) would result in that data being subject to decryption using the invisible key IKi. The processor 500, however, is capable of initiating data transfers between the local memory 350 and the shared DRAM 314 irrespective of whether it is in the secure mode of operation.

The invisible key IKi, stored in the secure storage memory 504, is accessible only by the decryption unit 502 of the processor 500 or by some other authorized entity. It is most preferred that even if an entity is authorized to know the invisible key IKi of a particular processor 500, such entity must be given access to the invisible key IKi in some way other than obtaining it from the secure memory 504 of the processor 500. For example, during the manufacturing process of the processor 500, the invisible key IKi is preferably stored in the secure memory 504, and on or about that same time, the invisible key IKi is made known to those entities authorized to obtain the information.

The processor 500 also preferably includes a substantially unique ID, such as a serial number or other identifying indicia. Unlike the invisible key IKi, however, the ID of the processor 500 is preferably known to any entity with an interest in utilizing the secure features of the processor 500. Thus, the ID may be thought of as a visible key VKi, where represents an i-th processor 500.

Figure 9:
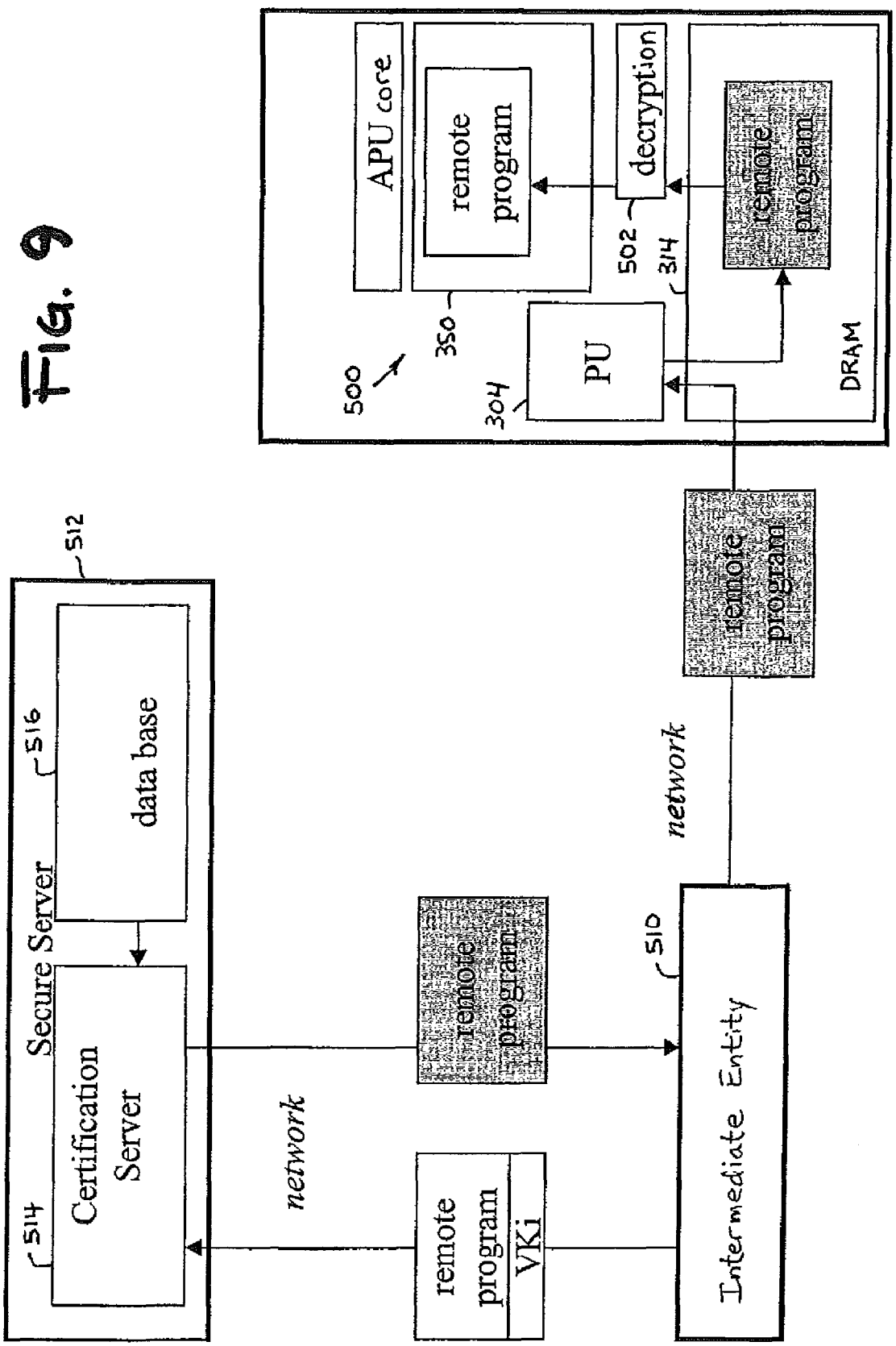
FIG. 9 is a block diagram of a system using the processor of FIG. 8 to employ certain security features of the present invention.

With reference to FIG. 9, a system is illustrated in which the security features of the processor 500 may be employed. The system includes the processor 500, an intermediate entity 510, and a secure entity (or server) 512. The secure entity 512 includes a certification server 514 and a database 516, which will be discussed in more detail below. It is noted that while FIG. 9 shows the structure of some aspects of the invention, it also shows data/process flow. Thus, FIG. 9 is employed herein to discuss the details of both apparatus and methods of the invention.

The intermediate entity 510 may be any entity or system that desires to transmit data or transmit and execute programs to the processor 500 in a secure fashion. Recall that the processor 500 may be one among a plurality of attached processing units that share the DRAM 314. Thus, the data transmitted from the intermediate entity 510 to the processor 500 may be stored at least temporarily in the shared DRAM 314. Under some circumstances, this could subject the data to piracy by other processors. In accordance with the invention, however, the intermediate entity 510 may transmit the data to the processor 500 in such a way that only the processor 500 may gain access to, and use of, the data.

In particular, the intermediate entity 510 obtains the visible key VKi associated with the processor 500. The intermediate entity 510 transmits the data (such as a remote program to be executed on the processor 500) and the visible key VKi to the secure server 512. This transmission may take place utilizing any of the known techniques, such as by way of the Internet, or any other network, communication link or by way of manual intervention. The secure server 512 obtains the visible key VKi from the transmission and employs the certification server 514 to search the database 516, which contains a plurality of visible key-invisible key pairs. The pairs of visible and invisible keys are associated with one another by way of their mutual relationship to a particular processor, such as processor 500. If a match is obtained between the visible key VKi received from the intermediate entity 510 and one of the stored visible keys in the database 516, then the certification server 514 preferably encrypts the data (in this example a remote program) using the invisible key IKi associated with the visible key VKi and the processor 500. The secure server 512 then transmits the encrypted data to the intermediate entity 510, for example, utilizing the Internet.

Although the intermediate entity 510 obtains an encrypted version of the data that it provided to the secure server 512, the intermediate entity 510 does not have any information concerning the invisible key IKi of the processor 500. In this respect, the secure server 512 is an authorized entity in that it has knowledge of the invisible key IKi contained in the secure memory 504 of the processor 500. While any entity, such as intermediate entity 510, may have knowledge of the visible key VKi of any given processor, only an authorized entity, such as the secure server 512 would have knowledge of the invisible key IKi and/or its association with a particular visible key VKi.

The intermediate entity 510 may then transmit the encrypted data to the processor 500, such as by way of the Internet, or any other appropriate mechanism. In accordance with the operational capabilities of the processor 500, the PU 304 facilitates the receipt of the encrypted data from the intermediate entity 510 and the storage of same in the shared DRAM 314. It is preferred that the processor 500 is in the secure mode of operation on or about the time that the PU 304 causes the encrypted data to be stored in the shared DRAM 314. Thus, when the PU 304 initiates the transfer of the encrypted data from the shared DRAM 314 to the local memory 350 of the processor 500, such encrypted data must pass through the decryption unit 502. Consequently, the decryption unit 502 decrypts the encrypted data utilizing the invisible key IKi stored in the secure memory 504 of the processor 500. Advantageously, the decrypted data, originated by the intermediate entity 510, is stored in the local memory 350 of the processor 500 in a secure fashion. Indeed, in the secure mode, neither the PU 304 nor any other external entry can obtain the data from the local memory 350 and the processor 500 may manipulate such data without being subject to piracy.

Figure 10:
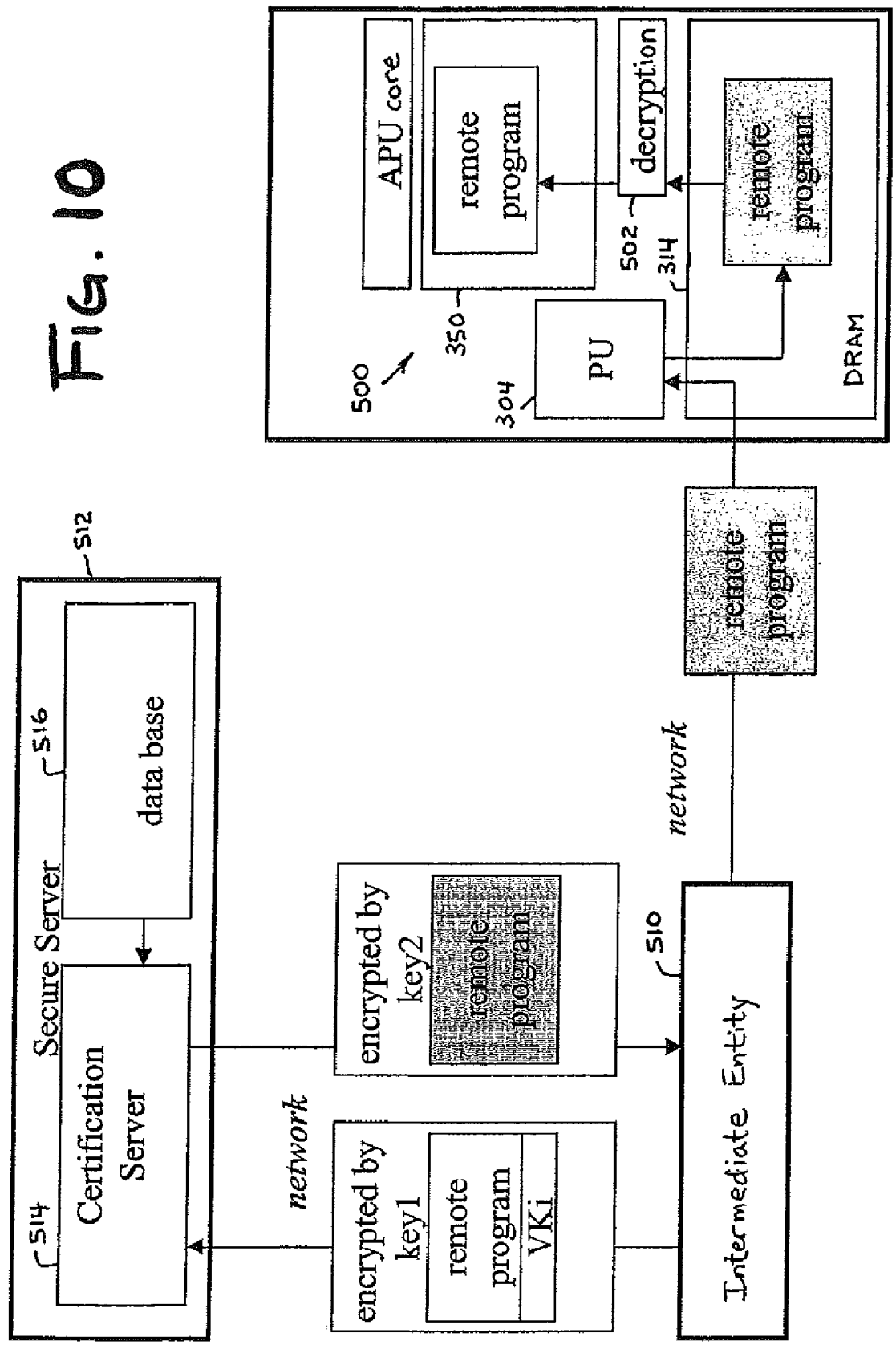
FIG. 10 is a block diagram of a system using the processor of FIG. 8 to employ further security features in accordance with the present invention.

Reference is now made to FIG. 10, which is a block diagram of the system of FIG. 9 employing an alternative approach to utilizing the security features of the processor 500. As with the approach discussed hereinabove with respect to FIG. 9, the intermediate entity 510 obtains the visible key VKi associated with the processor 500. Unlike that approach, however, the intermediate entity 510 encrypts at least the data (e.g., a remote program) using a symmetric key1. By way of example, the encryption technique utilized by the intermediate entity 510 may be the well-known Advanced Encryption Standard (AES), which enables the use of one or more symmetric keys to encrypt and decrypt sensitive data. It is noted that the intermediate entity 510 may encrypt both the data and the visible key VKi utilizing the symmetric key1. In any case, the intermediate entity 510 preferably transmits the encrypted data (and the visible key VKi) to the secure entity 512. The certification server 514 is preferably operable to receive the encrypted data and the visible key VKi, and to decrypt same utilizing a symmetric key2.

Once the certification server 514 has obtained the decrypted data and the visible key VKi, it searches the database 514 to find a visible key-invisible key pair. If a match is obtained between the visible key VKi received from the intermediate entity 510 and one of the stored visible keys in the database 516, then the certification server 514 preferably encrypts the data using the invisible key IKi associated with the visible key VKi and the processor 500. The certification server 514 also encrypts the encrypted data utilizing the symmetric key2 to obtain encrypted-encrypted data. The secure entity 512 then transmits the encrypted-encrypted data to the intermediate entity 510.

The intermediate entity 510 preferably receives the encrypted-encrypted data and decrypts same utilizing the symmetric key1 to obtain the data encrypted by the invisible key IKi. The intermediate entity 510 may then transmit the encrypted data to the processor 500, such as by way of the Internet, or any other appropriate mechanism. The PU 304 facilitates the receipt of the encrypted data from the intermediate entity 510 and the storage of same in the shared DRAM 314. It is preferred that the processor 500 is in the secure mode of operation on or about the time that the PU 304 causes the encrypted data to be stored in the shared DRAM 314. When the PU 304 initiates the transfer of the encrypted data from the shared DRAM 314 to the local memory 350 of the processor 500, such encrypted data must pass through the decryption unit 502. Consequently, the decryption unit 502 decrypts the encrypted data utilizing the invisible key IKi stored in the secure memory 504 of the processor 500. Advantageously, the decrypted data, originated by the intermediate entity 510, is stored in the local memory 350 of the processor 500 in a secure fashion. In the secure mode, neither the PU 304 nor any other external entity can obtain the data from the local memory 350 without authorization by the processor 500. Thus, the processor 500 may manipulate such data without being subject to piracy.

Figure 11:
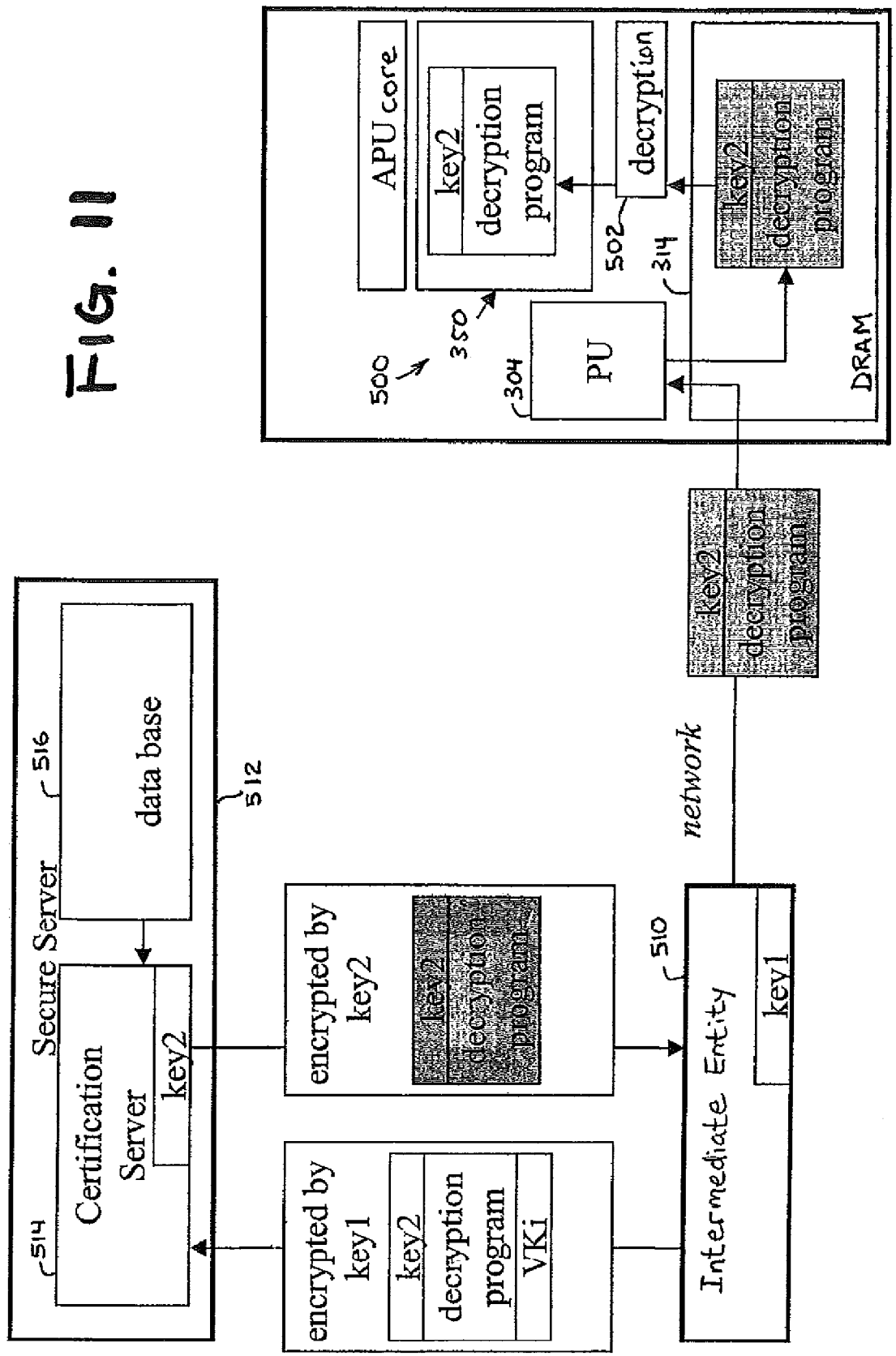
FIG. 11 is a block diagram of a system using the processor of FIG. 8 to employ still further security features in accordance with the present invention.
Figure 12:
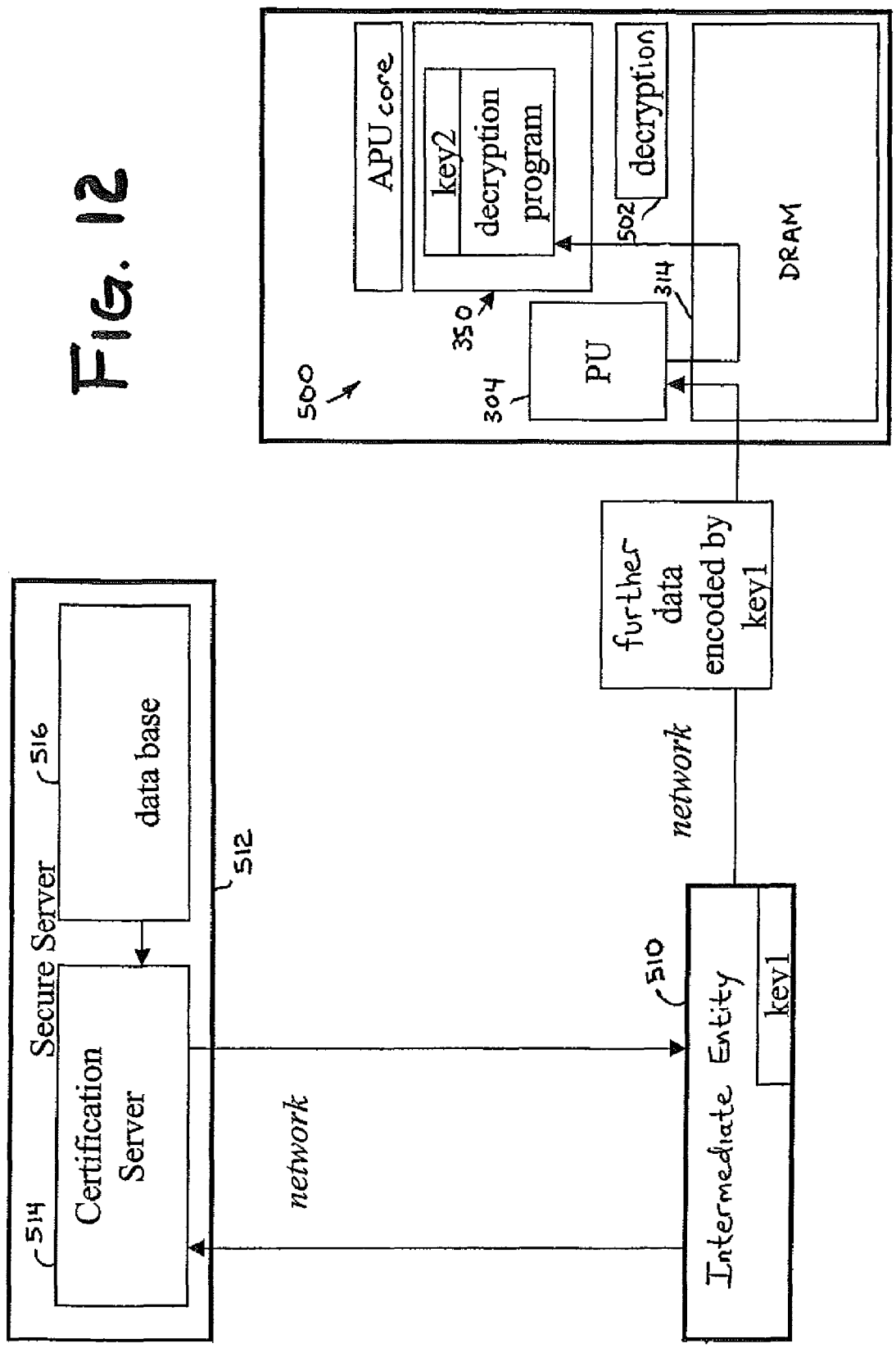
FIG. 12 illustrates further details of the system of FIG. 11.

Reference is now made to FIGS. 11-12, which are block diagrams of the system of FIG. 9 employing a further alternative approach to utilizing the security feature of the processor 500. In accordance with this embodiment of the present invention, the data includes a decryption program and a symmetric key (e.g., in accordance with the RSA protocol). The intermediate entity 510 encrypts the decryption program and the symmetric key2 utilizing a symmetric key1 (which is preferably a secret key known to only the intermediate entity 510 and any trusted entities). It is noted that the intermediate entity 510 may also encrypt the visible key VKi of the processor 500 along with the decryption program and the symmetric key2. In any case, the intermediate entity 510 transmits the encrypted decryption program/symmetric key2 and the visible key VKi to the secure server 512. The certification server 514 is preferably operable to decrypt the encrypted data utilizing symmetric key2 to obtain the decryption program and the visible key VKi (assuming that it was also encrypted with the decryption program) The key2 is preferably a public key in that others may also know the details of the key2. (It is also noted that the public key2 used by the certification server 514 may be different from the public key2 encrypted with the description program.) The certification server 514 then searches the database 516 to obtain a visible key-invisible key pair that matches the received visible key VKi. If a match is obtained, the certification server 514 preferably encrypts the decryption program and the symmetric key2 using the invisible key IKi associated with the visible key VKi and the processor 500. The certification server 514 also preferably encrypts the encrypted data utilizing the symmetric key2 (e.g., utilizing the RSA encryption technique). The secure server 512 then transmits the encrypted-encrypted data (e.g., the decryption program and the symmetric key2) to the intermediate entity 510, for example utilizing the Internet.

The intermediate entity 510 preferably decrypts the encrypted-encrypted data utilizing the symmetric (secret) key1 to obtain the encrypted data. At this point, the intermediate entity 510 has the decryption program and the symmetric (public) key2, which have been encrypted by the invisible key IKi. The intermediate entity 510 may then transmit the encrypted data (the decryption program and the symmetric key2) to the processor 500, such as by way of the Internet. As with the previous embodiment, the PU 304 facilitates the receipt of the encrypted data from the intermediate entity 510, the storage of same in the shared DRAM 314, and the transfer of the encrypted data through the decryption unit 502, such that the decryption program and the symmetric key2 are stored in the local memory 350 of the processor 500 in a secure fashion.

At this point, the processor is placed into the "secure mode," e.g., the third mode discussed above. More particularly, in the third mode, the processor 500 may initiate the transfer of information into or out of the processor 500, but any external device (such as the PU 304) cannot.

While this advantageously permits the processor 500 to manipulate the decryption program and the symmetric key2 in a secure manner, it also permits later secure data transfers in a simplified manner, which will be discussed in more detail with reference to FIG. 12.

The intermediate entity 510 preferably encrypts further data utilizing the symmetric (public) key1 and transmits same to the processor 500, for example, utilizing the Internet or any other appropriate mechanism. It is noted that the private key1 used by the intermediate entity 510 to encrypt the further data need not be the same private key1 used to encrypt the decryption program for transmission to the secure server 512. The PU 304 facilitates the receipt of the encrypted data from the intermediate entity 510 and the storage of same in the shared DRAM 314. It is noted that in this embodiment of the invention, the processor 500 need not be in the "isolated mode" of operation. Recall from the description above that in the isolated mode (the second mode) neither the processor 500 nor any external device may initiate a transfer of information into or out of the processor 500. Indeed, either the processor 500 or the PU 304 may initiate the transfer of the encrypted data from the shared DRAM 314 to the local memory 350 bypassing the decryption unit 502. This is so because the further data are encrypted utilizing the symmetric (private) key1 and neither the PU 304 nor any other external entity has knowledge of or access to the decryption program or the symmetric (public) key2 that are stored securely in the local memory 350. The processor 500 may then decrypt the encrypted further data utilizing the decryption program and the symmetric key2. Advantageously, the processor 500 receives the further data in a secure fashion and may receive yet further data in the same way without requiring resort to the secure mode of operation.

Figure 13:
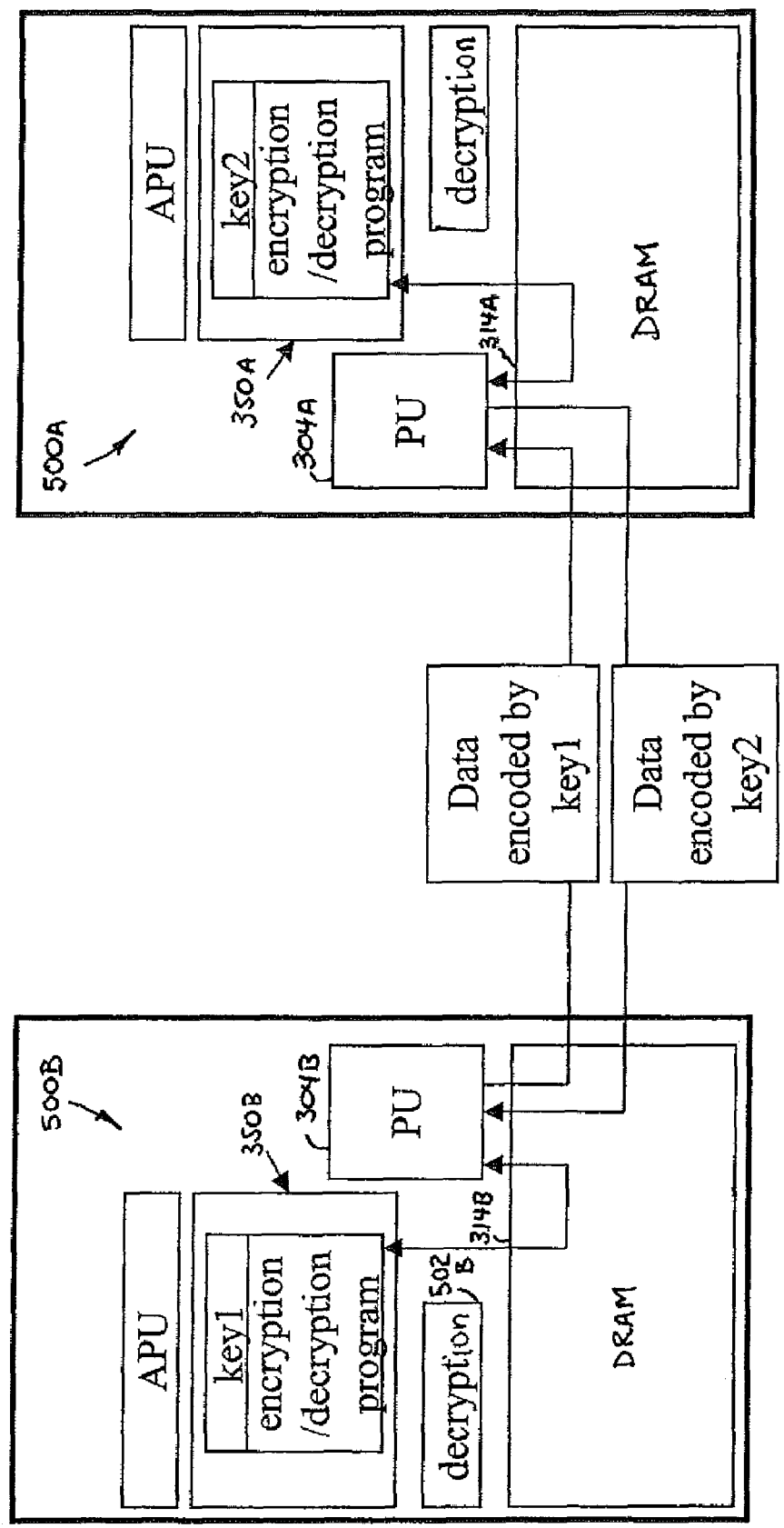
FIG. 13 is a block diagram of a system using the processor of FIG. 8 to employ still further security features in accordance with the present invention.

Reference is now made to FIG. 13, which is a block diagram showing two processors 500A and 500B that are operable to communicate with one another over the Internet or any other appropriate communication channel or mechanism. In accordance with this embodiment of the present invention, each processor 500A, 500B receives an encryption/decryption program and a symmetric key, preferably utilizing the approach discussed hereinabove with respect to FIG. 11. More particularly, the processor 500A preferably receives an encryption/decryption program and a symmetric key2, while the processor 500B receives an encryption/decryption program and a symmetric key1. It is preferred that the encryption/decryption program(s) and the symmetric keys adhere to the AES encryption methodology.

The secure transfer of data between processor 500A and processor 500B (also known as peer-to-peer communication) will now be described in more detail. In particular, the processor 500B may encrypt further data utilizing the encryption/decryption program and the symmetric key1 within the local memory 350B. The processor 500B may then transfer the encrypted data from the local memory 350B to the shared DRAM 314B. The PU 304B may then transfer the encrypted data from the shared DRAM 314B to the PU 304A associated with the processor 500A by way of the Internet. The PU 304A may then transfer the encrypted further data in the shared DRAM 314A associated with the processor 500A. The processor 500A or the PU 304A may then transfer the encrypted further data from the shared DRAM 314A to the local memory 350A bypassing the decryption unit 502A. Once in the local memory 350A, the encrypted further data may be decrypted utilizing the encryption/decryption program and the symmetric key2. Advantageously, the further data may be transferred between processor 500B and the processor 500A without further communications with the intermediate entity 510 (FIG. 11).

Still further data may also be transmitted from the processor 500A to the processor 500B utilizing a substantially similar technique as discussed hereinabove. Indeed, the processor 500A may encrypt the further data utilizing the encryption/decryption program and the symmetric key2 and transfer same to the shared DRAM 314A. The PU 304A may transfer such encrypted further data from the shared DRAM 314A to the PU 304B associated with the processor 500B via the Internet. The PU 304B may transfer the encrypted further data to the shared DRAM 314B associated with the processor 500B. The processor 500B or the PU 304B may then transfer the encrypted further data from the shared DRAM 314B to the local memory 350B, where it is decrypted utilizing the encryption/decryption program and the symmetric key1. Again, the secure transfer of the still further data from the processor 500A to the processor 500B may be made without further employment of the intermediate entity 510 or the secure server 512 (FIG. 11).

Figure 14:
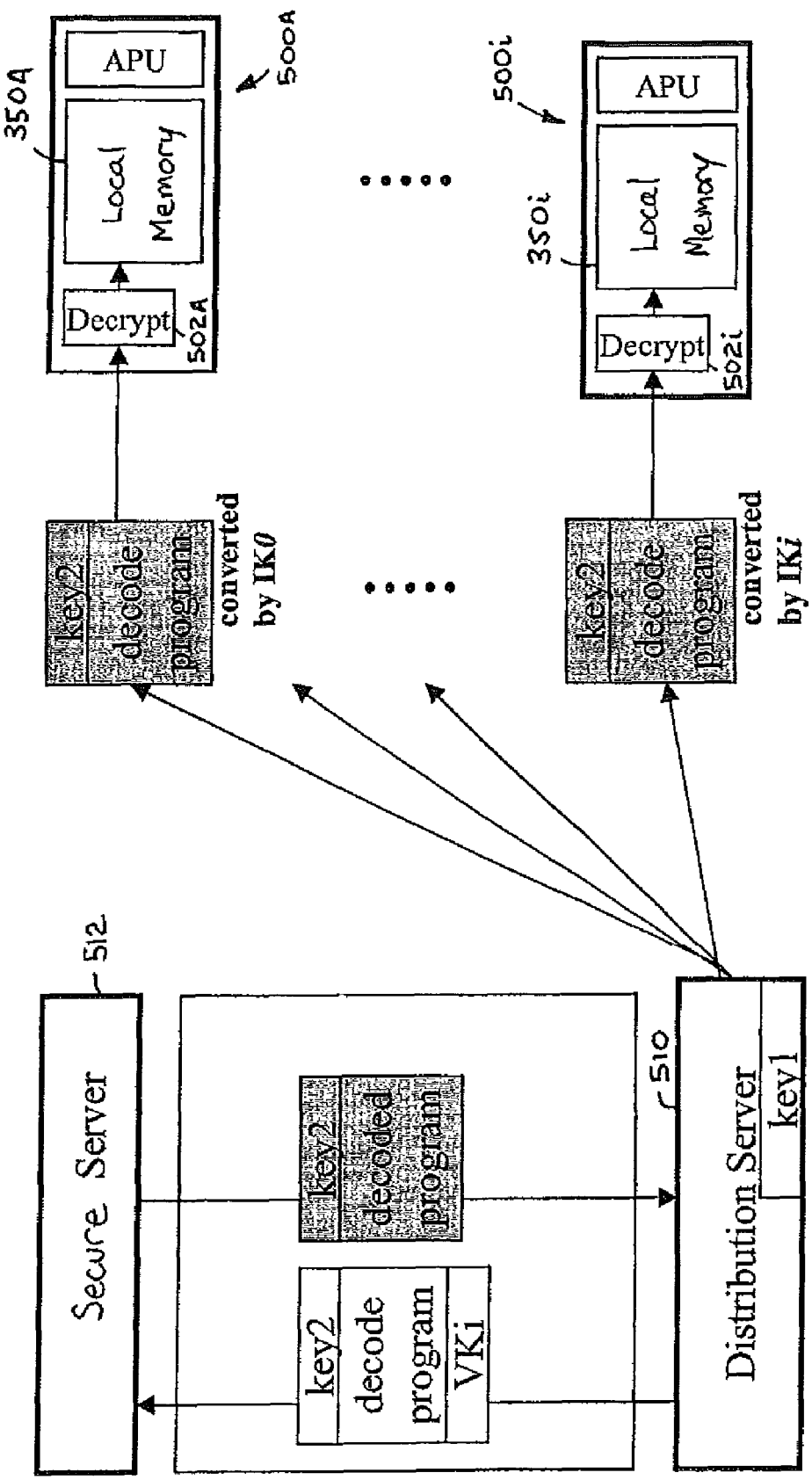
FIG. 14 is a block diagram of a system using the processor of FIG. 8 to employ still further security features in accordance with the present invention.
Figure 15:
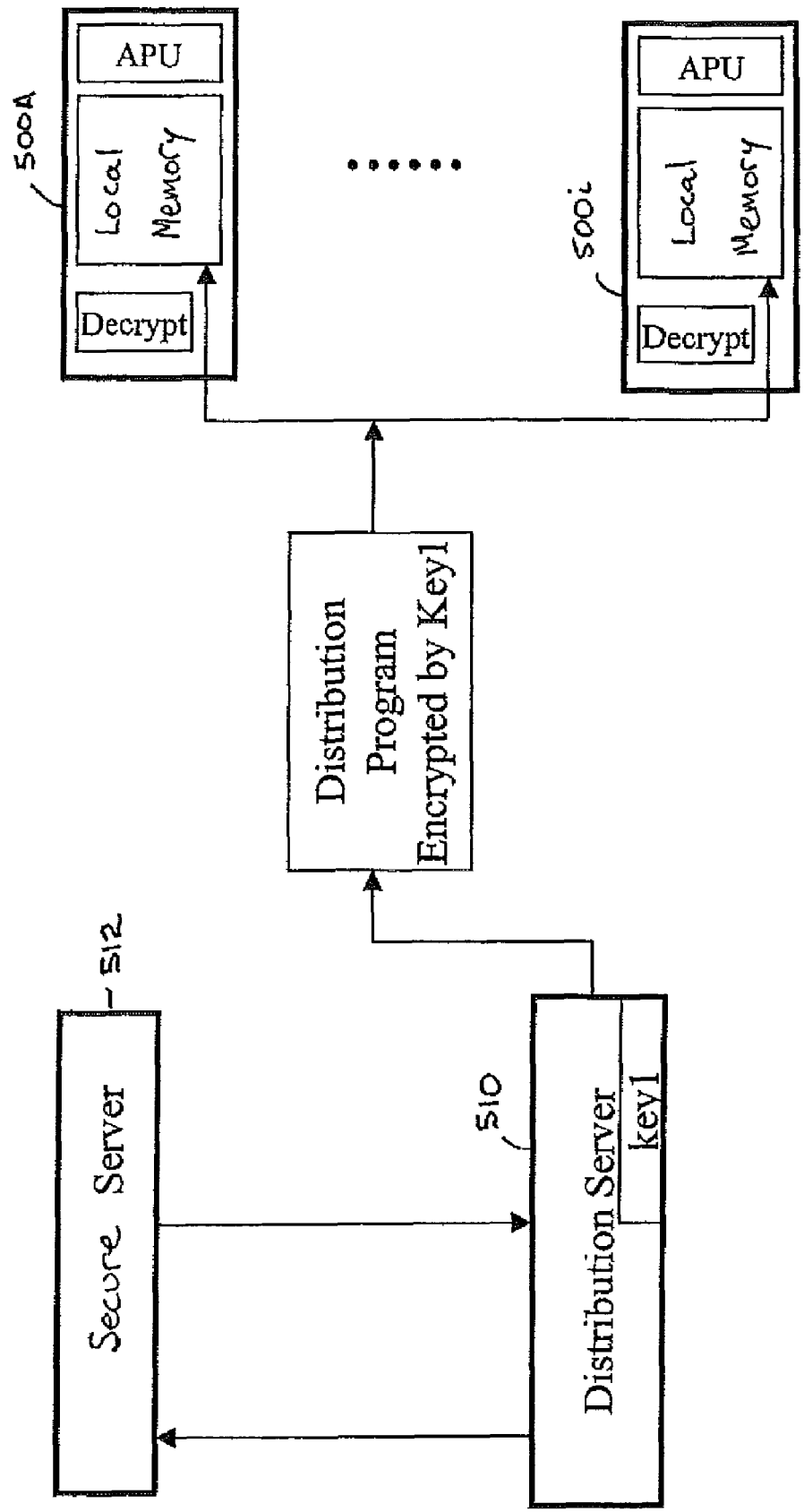
FIG. 15 illustrates further details of the system of FIG. 14.

Reference is now made to FIGS. 14-15, which are block diagrams of a system substantially similar to that of FIG. 9 and/or FIG. 10 in which a further alternative approach is employed to utilize the security features of a number of processors 500. In accordance with this embodiment of the present invention, the intermediate entity 510 (which may be a distribution server) transmits a decryption (or decode) program and a symmetric key2 to the secure server 512, preferably over a secure path as discussed hereinabove. The intermediate entity 510 also preferably transmits the respective visible keys VKi associated with each processor that are to participate in the transmission of further data in a secure manner. The secure server 512 transmits encrypted versions of the decode program and the symmetric key2 to the intermediate entity 510, where each version is encrypted with the particular invisible key IKi associated with a respective one of the received visible keys VKi. The intermediate entity 510 then transmits the respective versions of the encrypted decode program and symmetric key2 to the respective processors 500A, 500B, . . . 500*i*. Each of the processors are preferably in the secure mode of operation such that the respective versions of the encrypted decode program and the symmetric key2 must pass through the respective decryption units 502A, 502B . . . 502*i*. Thus, each processor 500A, 500B, . . . 500*i* obtains the decode program and the symmetric key2 in its associated local memory 350A, 406B, . . . 406*i*.

Thereafter, the intermediate entity 510 may transmit one version of further data, such as a distribution program, that has been encrypted by the symmetric key1 to each of the processors 500 (FIG. 15). Each of the processors 500 may then decrypt the encrypted further data utilizing the decode program and the symmetric key2 located in the respective local memory 350 thereof. Advantageously, the further data may be transmitted in a secure fashion without requiring different versions thereof for each participating processor 500. In this regard, the decode program may be considered a user "ticket" that permits a particular processor 500 to receive further data, such as a movie, music, game program, etc. As the ticket is only valid for a specific processor 500 (or user), only that user may receive and decrypt the encrypted distribution program. The distribution server 510, however, need only prepare one version of the distribution program, which although encrypted, may be decrypted by an authorized processor.

It will be appreciated from the foregoing, that the various embodiments of the invention may be used alone or in combination to achieve various secure operations, such as the processing and distribution of trusted code. Indeed, the origination of the trusted code may be verified and a determination may be made as to whether the trusted code has been tampered with. In addition, the invention may be used to authenticate data content, securely distribute data content, manage system privileges, process electronic commerce payments, manage peer-to-peer and manage client-to-server authentication. Still further, the invention may be used to achieve a secure boot-up procedure of a given processor by authenticating and verifying that an operating system has not been tampered with before booting up. The uses of the invention have not been enumerated in their entirety; indeed, those skilled in the art will appreciate that the uses of the invention are too numerous to list.

Figure 16:
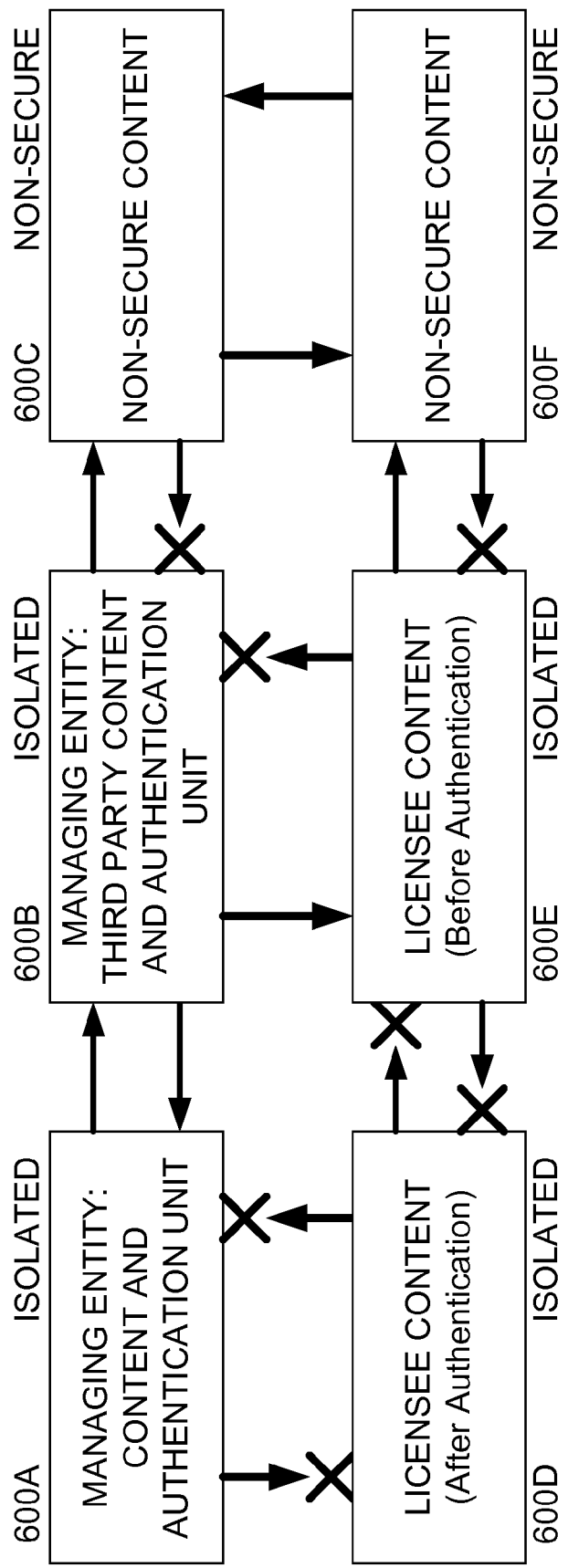
FIG. 16 is a block diagram of a system employing a plurality of processors in accordance with one or more further aspects of the present invention.

Reference is now made to FIG. 16, which illustrates a further example of how processor collaboration may be employed according to various aspects of the present invention. More particularly, FIG. 16 shows a block diagram of a plurality of processors 600A, 600B, . . . 600F, in communication with one another over a data bus, a network, and/or any other communication link. At least one of the processors 600 is "isolated" in that the data in the local memory thereof cannot be obtained without consent. In other words, the one or more processors 600 are in a secure mode of operation as discussed hereinabove. In the example illustrated in FIG. 16, processors 600A, 600B, 600D and 600E are in a secure mode of operation, while processors 600C, 600E, and 600F are in an un-secure mode of operation. Unless otherwise permitted, neither a secure nor an un-secure processor can receive data from the local memory of a secure processor. Thus, the un-secure processor 600C cannot unilaterally obtain data from the local memory of the processor 600B. Similarly, the secure processor 600E cannot unilaterally obtain data from the local memory of the secure processor 600B. Conversely, any processor 600 may unilaterally obtain data from the local memory of an un-secure processor. When permission has been obtained, however, such as by way of mutual collaboration, a server processor (e.g., processor 600A) may permit another processor (e.g., processor 600B) to unilaterally obtain data from its local memory.

The above system may be used, for example, in the management of a multi-party commercial venture, in which security of data are important. For example, processors 600A and 600B may be managing entities that contain proprietary content and/or provide authentication functions to other parties in the venture. Thus, processors 600D and 600E may authenticate content, e.g., verify and/or encrypt the content for later distribution or processing, using processor 600A and/or processor 600B. In this regard, processors 600D and 600E may be thought of as licensee's of the managing entity. Further, third party content may be available and/or processed on un-secure processors 600C and 600F.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus, comprising:
a main processing unit;
a plurality of attached processing units, each including a local memory, a decryption unit, and a secure store containing a substantially unique key, each attached processing unit being operable to enter a normal mode of operation or a secure mode of operation; and
a shared memory, wherein:
the main processing unit is capable of initiating data transfers between the shared memory and a given one of the attached processing units that bypass the decryption unit when the given attached processing unit is in the normal mode, and
the main processing unit is not capable of: (i) initiating data transfers from the given attached processing unit to the shared memory; or (ii) initiating data transfers from the shared memory to the given attached processing unit that bypass a respective decryption unit, when the given attached processing unit is in the secure mode;
wherein the decryption unit of the given attached processing unit uses a respective substantially unique key from respective secure store to decrypt data transfers from the shared memory to a local memory of the given attached processing unit that are initiated by the main processing unit when the given attached processing unit is in the secure mode of operation.

2. The apparatus of claim 1, wherein at least one of:
the attached processing units are capable of initiating data transfers with the shared memory irrespective of whether they are in the normal mode of operation or the secure mode of operation;
the attached processing units are operable to enter the secure mode of operation upon at least one of a hardware reset condition and a power-up condition; and
the substantially unique key is accessible only by at least one of the decryption unit of the given attached processing unit, and authorized entities.

3. The apparatus of claim 2, wherein at least one of:
the shared memory may contain encrypted data that has been encrypted using one of the substantially unique keys of the attached processing units;
each attached processing unit is associated with a substantially unique ID that may be known to entities external to at least one of the given attached processing unit, and the apparatus;
the encrypted data is encrypted by a secure entity external to the apparatus, the secure entity being authorized to use the key of the given attached processing unit; and
the secure entity includes a database containing the IDs and keys of participating attached processing units, each ID and key for a given attached processing unit being associated with one another.

4. The apparatus of claim 3, wherein at least one of:
the secure entity encrypts data received from an un-secure entity, not authorized to use the key of a given attached processing unit, with the key of the given attached processing unit after the un-secure entity provides an ID associated with that key to the secure entity;
the secure entity is operable to provide the encrypted data to the un-secure entity;
the un-secure entity is operable to provide the encrypted data to the apparatus for storage in the shared memory;
the main processing unit is operable to initiate a transfer of the encrypted data from the shared memory to the given attached processing unit such that the encrypted data is input into the decryption unit;

the decryption unit of the given attached processing unit is operable to decrypt the encrypted data using the key of the given attached processing unit such that the data is stored in the local memory of the given attached processing unit;

an un-secure entity, not authorized to use the key of a given attached processing unit, encrypts the data using a first symmetric key, provides the encrypted data to the secure entity, and provides an ID associated with a given attached processing unit to the secure entity;

the secure entity decrypts the encrypted data provided by the un-secure entity using a second symmetric key, and encrypts the data using the key of the given attached processing unit that is associated with the ID received from the un-secure entity;

the un-secure entity encrypts the data and the ID of the given attached processor unit using the first symmetric key and provides the encrypted data/ID to the secure entity;

the secure entity is operable to encrypt the encrypted data using the second symmetric key and provide the encrypted-encrypted data to the un-secure entity;

the un-secure entity is operable to decrypt the encrypted-encrypted data using the first symmetric key to obtain the encrypted data produced using the key of the given attached processing unit, and to provide the encrypted data to the apparatus for storage in the shared memory;

the main processing unit is operable to initiate a transfer of the encrypted data from the shared memory to the given attached processing unit such that the encrypted data is input into the decryption unit; and the decryption unit of the given attached processing unit is operable to decrypt the encrypted data using the key of the given attached processing unit such that the data is stored in the local memory of the given attached processing unit.

5. The apparatus of claim 4, wherein at least one of:

the data is a decryption program;

an un-secure entity, not authorized to use the key of a given attached processing unit, encrypts the decryption program using a first symmetric key, provides the encrypted decryption program to the secure entity, and provides an ID associated with a given attached processing unit to the secure entity; and the secure entity decrypts the encrypted decryption program provided by the un-secure entity using a second symmetric key, and encrypts the decryption program and the second symmetric key using the key of the given attached processing unit that is associated with the ID received from the un-secure entity.

6. The apparatus of claim 5, wherein at least one of:

the un-secure entity encrypts the decryption program and the ID of the given attached processor unit using the first symmetric key and provides the encrypted decryption program/ID to the secure entity; and the un-secure entity encrypts the decryption program, the ID of the given attached processor unit, and the second symmetric key using the first symmetric key and provides the encrypted decryption program/ID/second symmetric key to the secure entity.

7. The apparatus of claim 6, wherein at least one of:

the secure entity is operable to encrypt the encrypted decryption program and the second symmetric key using the second symmetric key and provide the encrypted-encrypted decryption program/second symmetric key to the un-secure entity;

the un-secure entity is operable to decrypt the encrypted-encrypted decryption program/second symmetric key using the first symmetric key to obtain the encrypted decryption program/second symmetric key produced using the key of the given attached processing unit, and to provide the encrypted decryption program/second symmetric key to the apparatus for storage in the shared memory;

the main processing unit is operable to initiate a transfer of the encrypted decryption program/second symmetric key from the shared memory to the given attached processing unit such that the encrypted decryption program/second symmetric key is input into the decryption unit;

the decryption unit of the given attached processing unit is operable to decrypt the encrypted decryption program/second symmetric key using the key of the given attached processing unit such that the decryption program and the second symmetric key are stored in the local memory of the given attached processing unit;

the un-secure entity is operable to encrypt data using the first symmetric key and provide the encrypted data to the apparatus for storage in the shared memory; and the given attached processing unit is capable of receiving the encrypted data from the shared memory into the local memory bypassing the decryption unit.

8. The apparatus of claim 7, wherein at least one of:

the given attached processing unit may be in either of the normal mode or the secure mode when the encrypted data is received into the local memory from the shared memory;

the given attached processing unit is operable to decrypt the encrypted data using the decryption program and the second symmetric key;

the data may include a software program; and the main processing unit is operable to initiate the transfer of the encrypted data from the shared memory into the local memory of the given attached processing unit bypassing the decryption unit.

9. A method, comprising:

providing a main processing unit, a plurality of attached processing units, and a shared memory, each attached processing unit including a local memory, a decryption unit and a secure store containing a substantially unique key, each attached processing unit being operable to enter a secure mode of operation;

prohibiting the main processing unit from initiating a data transfer from the shared memory to a given one of the attached processing units that bypasses the decryption unit, when the given attached processing unit is in the secure mode, such that any data transfer into the local memory thereof that is externally initiated must be decrypted by the decryption unit using a key that is substantially unique to the given attached processing unit and that is known by only authorized entities and initiating a transfer of encrypted data from the shared memory to the given attached processing unit when the given processing unit is in the secure mode such that the encrypted data are decrypted by the decryption unit using the key thereof.

10. The method of claim 9, further comprising at least one of:

permitting the attached processing units to initiate data transfers with the shared memory irrespective of whether they are in the secure mode of operation;

causing the attached processing units to enter the secure mode of operation upon at least one of a hardware reset condition and a power-up condition;

transmitting data and an ID associated with a given one of the attached processing units from an intermediate entity to a secure entity;
searching a database of the secure entity containing IDs and associated keys of participating attached processing units and obtaining the key associated with the given attached processing unit for which the ID was received;
encrypting the data transmitted to the secure entity using the key associated with the given attached processing unit for which the ID was received; and
transmitting the encrypted data from the secure entity to the intermediate entity.

11. The method of claim 10, further comprising:
transmitting the encrypted data from the intermediate entity to the shared memory; and
storing the data in the local memory of the given attached processing unit.

12. The method of claim 9, further comprising at least one of:
encrypting at least one of the data and an ID associated with the given attached processing units at the intermediate entity using a first symmetric key;
transmitting the encrypted data and the ID from the intermediate entity to a secure entity;
decrypting the at least one of the encrypted data and the ID at the secure entity using a second symmetric key;
searching a database of the secure entity containing IDs and associated keys of participating attached processing units and obtaining the key associated with the given attached processing unit for which the ID was received;
encrypting the data at the secure entity using the key associated with the given attached processing unit, and encrypting the encrypted data using the second symmetric key;
transmitting the encrypted-encrypted data from the secure entity to the intermediate entity;
decrypting the encrypted-encrypted data at the intermediate entity using the first symmetric key to obtain the data encrypted by the key associated with the given attached processing unit;
transmitting the encrypted data from the intermediate entity to shared memory of the given attached processing unit;
initiating a transfer of the encrypted data from the shared memory to the given attached processing unit when the given processing unit is in the secure mode such that the encrypted data are decrypted by the decryption unit using the key thereof; and
storing the data in the local memory of the given attached processing unit.

13. The method of claim 12, wherein:
the data includes one or more of: (i) a decryption program, (ii) the second symmetric key, (iii) an encryption/decryption program, and (iv) one of a pair of symmetric keys associated with the encryption/decryption program, such that same are stored in the local memory of the given attached processing unit, and
the method further comprising at least one of:
encrypting further data at the intermediate entity using the first symmetric key;
transmitting the encrypted further data from the intermediate entity to the given attached processing unit for storage in the shared memory;
initiating the transfer of the encrypted further data from the shared memory to the local memory, while the given attached processing unit is not in the secure mode, such that the decryption unit is bypassed;
using the given attached processing unit to decrypt the encrypted further data using the decryption program and the second symmetric key; and
repeating the steps of the method using further data and a further attached processing unit, the further data including (i) a further encryption/decryption program, and (ii) another of the pair of symmetric keys associated with the further encryption/decryption program, such that same are stored in the local memory of the further attached processing unit.

14. The method of claim 13, further comprising at least one of:
encrypting further data using the encryption/decryption program and the one symmetric key of the given attached processing unit;
transmitting the encrypted further data from the given attached processing unit to the further attached processing unit for storage in a shared memory thereof;
initiating the transfer of the encrypted further data from the shared memory to the local memory of the further attached processing unit, while the further attached processing unit is not in the secure mode, such that the decryption unit thereof is bypassed;
using the further attached processing unit to decrypt the encrypted further data using the further encryption/decryption program and the other symmetric key;
encrypting further data using the encryption/decryption program and the other symmetric key of the further attached processing unit;
transmitting the encrypted further data from the further attached processing unit to the given attached processing unit for storage in a shared memory thereof; and
initiating the transfer of the encrypted further data from the shared memory to the local memory of the given attached processing unit, while the given attached processing unit is not in the secure mode, such that the decryption unit thereof is bypassed.

15. The method of claim 14, wherein at least one of:
the method further comprises using the given attached processing unit to decrypt the encrypted further data using the encryption/decryption program and the one symmetric key, and
the shared memory of the given attached processing unit is the same memory as the shared memory of the further attached processing unit.

16. The method of claim 12, wherein at least one of:
the data includes (i) a decryption program, and (ii) the second symmetric key associated with the decryption program, such that same are stored in the local memory of the given attached processing unit, and
the method further comprises at least one of:
repeating the steps of the method using further attached processing units, such that the decryption program and the second symmetric key are stored in each of the attached processing units;
encrypting further data at the intermediate entity using the first symmetric key;
transmitting the encrypted further data from the intermediate entity to each of the attached processing units for storage in the shared memory thereof;
initiating the transfer of the encrypted further data from the shared memory to the respective local memories of the attached processing units, while the attached processing units are not in the secure mode, such that the respective decryption units thereof are bypassed; and
using the attached processing units to decrypt the encrypted further data using the respective decryption programs and the second symmetric keys.

* * * * *